United States Patent
Dimson et al.

(10) Patent No.: US 11,030,238 B2
(45) Date of Patent: *Jun. 8, 2021

(54) DETERMINING AND UTILIZING CONTEXTUAL MEANING OF DIGITAL STANDARDIZED IMAGE CHARACTERS

(71) Applicant: Facebook, Inc., Menlo Park, CA (US)

(72) Inventors: Thomas Frederick Dimson, Stanford, CA (US); Bogdan State, Menlo Park, CA (US); Shankar Kalyanaraman, Brooklyn, NY (US); Hamdan Azhar, Valley Stream, NY (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/702,371

(22) Filed: Dec. 3, 2019

(65) Prior Publication Data
US 2020/0104316 A1  Apr. 2, 2020

Related U.S. Application Data

(63) Continuation of application No. 14/956,148, filed on Dec. 1, 2015, now Pat. No. 10,546,015.

(51) Int. Cl.
*G06F 16/583* (2019.01)

(52) U.S. Cl.
CPC ................ *G06F 16/5838* (2019.01)

(58) Field of Classification Search
CPC ............. G06F 16/583; G06F 16/5938; G06F 16/5866; G06F 16/5846
USPC ................................ 707/769, 772
See application file for complete search history.

(56) References Cited

U.S. PATENT DOCUMENTS

| | | | |
|---|---|---|---|
| 8,442,940 B1 | 5/2013 | Faletti et al. | |
| 2005/0237577 A1* | 10/2005 | Alasia | B42D 25/351 358/3.28 |
| 2009/0028445 A1* | 1/2009 | Wu | G06K 9/723 382/225 |
| 2009/0028446 A1* | 1/2009 | Wu | G06K 9/723 382/229 |
| 2009/0285492 A1 | 11/2009 | Ramanujapuram et al. | |
| 2010/0185978 A1 | 7/2010 | Laurie et al. | |
| 2016/0012465 A1* | 1/2016 | Sharp | G06Q 20/386 705/14.17 |
| 2016/0224684 A1* | 8/2016 | Corlett | G06F 3/04817 |
| 2017/0154055 A1 | 6/2017 | Dimson et al. | |

OTHER PUBLICATIONS

U.S. Appl. No. 14/956,148, Jun. 12, 2019, Office Action.
U.S. Appl. No. 14/956,148, Sep. 25, 2019, Notice of Allowance.

* cited by examiner

*Primary Examiner* — James Trujillo
*Assistant Examiner* — Fariborz Khoshnoodi
(74) *Attorney, Agent, or Firm* — Keller Jolley Preece

(57) ABSTRACT

One or more embodiments of the disclosure include a character management system that determines and utilizes contextual meaning with regard to standardized image characters. In particular, the character management system determines contextual meaning with regard to standardized characters based on the manner in which the standardized characters are utilized in a repository of electronic documents. Moreover, the character management system can utilize the contextual meaning to search, recommend, analyze, and translate with regard to the use of standardized image characters.

20 Claims, 14 Drawing Sheets

DETERMINING AND UTILIZING CONTEXTUAL MEANING OF DIGITAL STANDARDIZED IMAGE CHARACTERS

CROSS-REFERENCE TO RELATED APPLICATIONS

The present application is a continuation of U.S. application Ser. No. 14/956,148, filed on Dec. 1, 2015. The aforementioned application is hereby incorporated by reference in its entirety.

BACKGROUND

1. Technical Field

One or more embodiments relate to digital standardized image characters. More specifically, one or more embodiments of the present invention relate to systems and methods for identifying and utilizing contextual meaning of digital standardized image characters in computing systems.

2. Background and Relevant Art

The rising prevalence of computing devices has changed the way that individuals and businesses communicate and interact. In fact, the popularity of computing devices has fundamentally changed the actual language of communication. For example, as a result of the increased use of instant messaging and texting, terms such as "lol" and "bff" have become commonplace in the English lexicon. Similarly, the "#" symbol has transformed itself from a character generally meaning "number" or "pound" into the ubiquitous "hashtag," now commonly utilized to flag electronic content, such as social media posts.

Likewise, largely as a result of the increased use of computing devices, individuals now commonly utilize digital standardized image characters (e.g., emoji) to express themselves in electronic communications. Indeed, smiley faces, hearts, thumbs-up, and other standardized image characters now commonly replace words in many electronic documents, such as social media posts, e-mails, texts, tags, comments, or instant messages. In fact, it is now common to combine both a "hashtag" and digital standardized image characters (e.g., emoji) to tag electronic documents (e.g., #whathasthisworldcometo☺).

Despite the increasing prevalence of standardized image characters, very few systems provide a means of incorporating or analyzing standardized image characters into computing systems. For instance, most common computing systems do little more than provide, send, and receive standardized image characters. Often, common computing systems provide little support for standardized image characters because the use of digital standardized image characters introduces a number of problems not normally encountered with regard to manipulation and utilization of other alphabetic or numerical characters.

For example, unlike words or numbers, standardized image characters (e.g., emoji) do not have well-defined meanings or usage rules (e.g., spelling or grammar rules). Similarly, unlike traditional alphabetic or numeric characters, familiarity with standardized image characters varies wildly amongst users. For example, some individuals have never (or very rarely) utilized standardized image characters, while other individuals utilize standardized image characters as frequently as alpha-numeric characters. Moreover, in light of the recent, rapid, and continuing evolution of standardized image characters, the meaning and usage of individual standardized image characters varies rapidly over time and significantly amongst groups or populations.

In addition, standardized image characters are often expressed in terms of code that are much more difficult to identify than traditional alpha-numeric symbols. Indeed, the syntax of a particular emoji may differ from platform to platform and code base to code base. Similarly, different emoji are expressed utilizing different numbers of code points and variant characters. Furthermore, in contrast to traditional alpha-numeric characters, standardized image characters are constantly being added or revised over time.

Accordingly, there is much to be considered in terms of identifying and utilizing digital standardized image characters in computing systems.

SUMMARY

One or more embodiments described below provide benefits and/or solve one or more of the foregoing or other problems in the art with systems and methods for identifying and utilizing digital standardized image characters. In particular, one or more embodiments include systems and methods that identify contextual meaning for standardized image characters and utilize identified contextual meaning with regard to standardized image characters to search within electronic documents. Similarly, in one or more embodiments, systems and methods utilize identified contextual meaning with regard to standardized image characters to recommend standardized image characters to users, making standardized image characters easier to utilize, enter, and correctly employ.

For example, one or more embodiments include systems and methods that identify a plurality of standardized image characters from a repository of electronic documents. The systems and methods can identify a contextual meaning for the plurality of standardized image characters based on the manner in which the standardized image characters are utilized in the repository of electronic documents. Furthermore, in one or more embodiments, systems and methods receive a search query from a client device, and provide results of the search query to the client device utilizing the identified contextual meaning for at least one of the plurality of standardized image characters.

By identifying contextual meaning of standardized image characters from a repository of electronic documents, the disclosed systems and methods can identify a meaning to utilize in searching, recommending, analyzing, and otherwise utilizing standardized image characters. Indeed, the systems and methods can transform standardized image characters into terms that can be identified, searched, compared, analyzed, recommended, and modified.

Moreover, by periodically updating the repository of electronic documents, in one or more embodiments, the disclosed systems and methods account for variations in meaning and usage of individual standardized image characters over time. Thus, for example, as users utilize standardized image characters in new contexts, the systems and methods can detect the new context from analyzing an updated repository of electronic documents and alter searches, recommendations, comparisons, etc. based on the new context.

Similarly, by maintaining a repository of electronic documents with regard to particular characteristics or factors (e.g., groups corresponding to culture, region, language, etc.), the disclosed systems and methods can identify a particularized contextual meaning of the standardized image characters that is specific to particular populations. Thus, the systems and methods can tailor searches, recommendations, and utilization of standardized image characters based on the unique contextual meaning of particular populations of users.

Moreover, the disclosed systems and methods can identify and provide standardized image characters across platforms and code bases, including standardized image characters that utilize various code points and variant characters. In this manner, the systems and methods can identify standardized image characters utilized in a variety of electronic documents from a variety of different sources (e.g., hashtags used in conjunction with standardized image characters provided from a variety of devices utilizing different platforms).

Additional features and advantages of will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
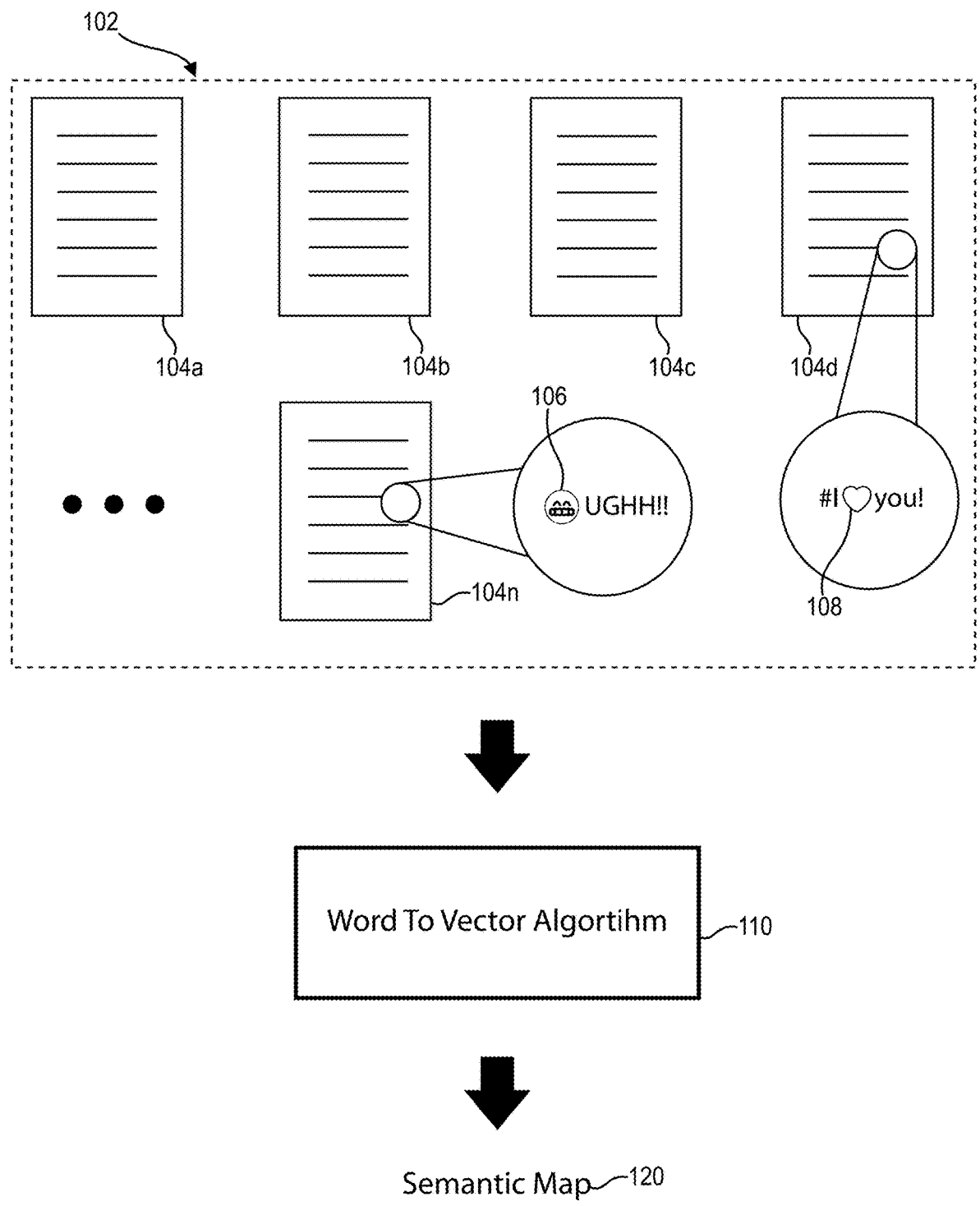
FIG. 1 illustrates a representation of identifying a contextual meaning from a repository of electronic documents in accordance with one or more embodiments.

One or more embodiments of the present invention include a character management system that identifies and utilizes digital standardized image characters. In particular, in one or more embodiments, the character management system identifies a contextual meaning of one or more standardized image characters. Moreover, utilizing the contextual meaning, the character management system can search, recommend, analyze, and utilize standardized image characters in various digital applications. In addition, the character management system can enable users to more easily understand, identify, and communicate information with regard to standardized image characters.

For example, in one or more embodiments the character management system identifies a plurality of standardized image characters from a repository of electronic documents (e.g., electronic communications such as social media posts). Moreover, the character management system can identify a contextual meaning for the plurality of standardized image characters based on the manner in which the standardized image characters are utilized in the repository of electronic documents. In one or more embodiments, the character management system receives a search query from a client device and provides results of the search query to the client device utilizing the identified contextual meaning for at least one of the plurality of standardized image characters.

By identifying a contextual meaning of standardized image characters based on usage, the character management system can utilize standardized image characters to provide greater functionality to users. For example, as just mentioned, the character management system can search for standardized image characters based on contextual meanings. Similarly, the character management system can recommend standardized image characters based on contextual meanings. In addition, the character management system can determine sentiment with regard to usage of standardized image characters. Moreover, the character management can analyze, compare, translate, identify and provide standardized image characters. In short, in one or more embodiments, the character management system enables users to more easily, quickly, and intuitively utilize standardized image characters with regard to communication, searching, and other applications.

In one or more embodiments, the character management system identifies and provides standardized image characters with regard to multiple platforms and code bases. For instance, the character management system can identify and provide standardized image characters that utilize various code points and variant characters. Thus, the character management system can support (e.g., index and search) tags that contain standardized image characters from a variety of sources. In particular, in one or more embodiments, the character management system can parse hashtags containing standardized image characters using a regular expression that accounts for character variations and programming language differences.

Moreover, in one or more embodiments the character management system dynamically updates upon detection of new standardized image characters. For instance, the character management system can identify standardized image characters from one or more updating character databases. The character management system can update a regular expression based on modifications to an updating character database to identify new standardized image characters as they develop.

As mentioned, in one or more embodiments, the character management system identifies a contextual meaning of standardized image characters. In particular, in one or more embodiments, the character management system accesses a document repository containing electronic documents reflecting usage of standardized image characters. Moreover, the character management identifies the usage of standardized image characters in the document repository and utilizes natural language processing to identify a contextual meaning. More specifically, in one or more embodiments, the character management system utilizes a word to vector algorithm to generate a semantic map defining the contextual meaning of one or more standardized image characters.

Upon identifying a contextual meaning, the character management system can utilize the contextual meaning in various searches. For example, the character management system can enable a user to run a search for standardized image characters based on contextual meaning. Similarly, the character management system can identify standardized image characters in search results. More particularly, the character management system can receive a search query from a user (e.g., a search query for text, a standardized image character, or an image) and identify search query results that include standardized image characters.

Moreover, in one or more embodiments, the character management system can recommend standardized image characters. For instance, the character management system can recommend standardized image characters as search terms in a search query based on other search terms provided by a user. Similarly, the character management system can recommend standardized image characters in an electronic communication based on other terms utilized in the electronic communication.

Furthermore, based on contextual meaning, in one or more embodiments, the character management system can suggest corrections (e.g., auto-corrections) to standardized image characters. For instance, in one or more embodiments, the character management system can identify a standardized image character in an electronic communication and determine that the manner in which the standardized image character is used conflicts with its contextual meaning. In response, the character management system can correct or suggest a correction for the standardized image character. For instance, the character management system can suggest a different standardized image character that better corresponds to the particular context and usage.

The character management system can also utilize contextual meaning of standardized image characters to identify user sentiment. For example, in one or more embodiments, the character management system can identify standardized image characters utilized with regard to a product, brand, advertisement, celebrity, or individual. Moreover, the character management system can utilize contextual meaning of the identified standardized image characters to identify user sentiment with regard to the product or advertisement.

In addition, by identifying contextual meaning from a repository of electronic documents, the character management system can more accurately identify contextual meaning with regard to standardized image characters. For instance, the character management system can provide search results, recommendations, and analysis based on up-to-date usage of standardized image characters. Moreover, the character management system can dynamically update the contextual meaning of standardized image characters as usage evolves, and incorporate new standardized image characters as they are created and utilized.

Furthermore, by controlling electronic documents with regard to a repository of electronic documents, the character management system can identify a particularized contextual meaning specific to characteristics or features of specific populations. For example, by generating a repository of electronic documents with regard to a particular language, culture, or region, the character management system can identify a particularized contextual meaning of standardized image characters with regard to the particular language, culture, or region.

As used herein, the term "standardized image character" refers to a digital picture or pictorial symbol that is part of a standardized set of characters. For instance, the term "standardized image character" includes a digital image or icon used to express an idea or emotion and defined by a standardized system for indexing characters across different operating systems. For example, the term "standardized image character" includes digital image incorporated into the Unicode standard system. Moreover, the term "standardized image character" includes emoji picture characters incorporated into Unicode or some other standardized system for indexing characters.

Although standardized image characters are part of a standardized set, it will be appreciated that standardized image characters may differ in their digital coding and/or form of expression. For example, with regard to emoji expressed in Unicode, the appearance of emoji can differ across devices, operating systems, etc. Similarly, different operating systems can utilize different languages, characters, or encodings to identify the standardized image character. Thus, for instance, a first operating system can utilize a first image to portray a standardized image character utilizing a first coding language, whereas a second operating system can utilize a second image to portray the same standardized image character utilizing a second coding language. Accordingly, a standardized image character can belong to a standardized set of characters while varying in terms of expression and coding.

As used herein, the term "contextual meaning" refers to a meaning inferred based on usage. In particular, contextual meaning includes a meaning of a standardized image character inferred based on the context of usage of the standardized image character. For example, contextual meaning includes a meaning derived from the manner in which a standardized image character is used in an electronic document with regard to other characters. Similarly, contextual meaning includes a meaning of a standardized image character derived from utilizing natural language processing with regard to a repository of electronic documents that contain the standardized image character. For example, contextual meaning can include characters, keywords, emoji, etc., that are associated with a standardized image character based on the context of the standardized image character's usage. In addition, contextual meaning can indicate a dis-similarity or contradiction with other terms or characters. Moreover, contextual meanings can provide (or be derived from) a semantic map defining the meaning of a standardized image character generated from a repository of electronic documents.

As used herein, the term "electronic document" refers to any form of electronic content, regardless of form. For example, an electronic document can include a word processing document, a .pdf, an image, an e-mail, a text, a chat, an instant message, a web page, a social media post, a comment, a tag (e.g., hashtag), a database, or any other electronic file or communication.

As used herein, the term "tag" refers to digital content that is an identifier of other digital content. For instance, the term "tag" includes a type of label used on social network and/or microblogging services that enables identification and/or categorization of digital content. For example, the term "tag" includes a hashtag, which is a hash character (i.e., #) combined with one or more additional identifying characters utilized to identify digital content utilized in conjunction with the hash character.

Turning now to FIG. 1, additional detail will be provided regarding identifying a contextual meaning of a standardized image character. In particular, FIG. 1 illustrates a representation of identifying a contextual meaning for a plurality of standardized image characters from a repository of electronic documents.

More specifically, FIG. 1 illustrates a representation of a repository 102 containing a plurality of electronic documents 104a-104n. As shown, the plurality of electronic documents 104a-104n contain standardized image characters, including a first standardized image character 106 and a second standardized image character 108.

As mentioned previously, the electronic documents 104a-104n can comprise any type of electronic documents. Indeed, although the electronic documents 104a-104n are illustrated as pages (e.g., web pages or pages from a word processing document), the electronic documents 104a-104n can comprise any type of electronic documents including, for example, e-mails, texts, instant messages, chat communications, social media posts, comments, annotations, spreadsheets, tags, or images.

Similarly, the repository 102 can comprise any compilation or collection of electronic documents. For instance, the repository 102 can comprise a single digital file containing text from a plurality of electronic documents. Alternatively or additionally, the repository 102 can comprise a database of a plurality of electronic documents; one or more servers or computer readable storage media storing a plurality of electronic documents; or an index of the contents of a plurality of electronic documents.

In one or more embodiments, the character management system generates the repository 102. For instance, in one or more embodiments, the character management system gathers a plurality of electronic documents and creates the repository 102. For example, the character management system can gather social media posts, comments, and/or tags by a plurality of users and generate the repository 102 by compiling the gathered social media posts, comments, and/or tags into a file, server, storage medium, or other digital collection. Similarly, the character management system can gather a plurality of web pages and compile the plurality of web pages into a repository of web pages. Likewise, the character management system can detect multiple types of electronic documents (e.g., texts, e-mails, and social media posts) and create a repository based on the types of electronic documents.

The character management system can generate the repository 102 based on one or more characteristics of a user or population. For example, the character management system can generate the repository 102 based on location, language, gender, sex, ethnicity, age, and/or other demographic information. Similarly, the character management system can generate the repository 102 based on a device associated with one or more users (e.g., mobile device, laptop, tablet, device brand, etc.), an application utilized by one or more users (e.g., a particular social media application utilized by a user, a particular internet browser application utilized by a user), or an operating system utilized by one or more users.

For instance, the character management system can generate the repository 102 such that it contains social media posts originating from a particular country or geographic region. Similarly, the character management system can generate the repository 102 such that it contains electronic documents from individuals of a certain age utilizing a certain client device. Likewise, the character management system can generate the repository 102 such that it contains web pages written in a particular language. In this manner, the character management system can tailor the repository 102 (and subsequent contextual meanings gleaned from the repository 102) to characteristics of a particular population and/or user.

The character management system can also generate the repository 102 based on the contents of electronic documents. For instance, the character management system can generate the repository 102 such that each electronic document contains a particular standardized image character. Similarly, the character management system can generate the repository 102 based on a type of electronic document (e.g., limit the repository 102 to texts and social media posts, limit the repository 102 to web pages, or limit the repository 102 to social media tags). Similarly, the character management system can generate the repository 102 based on a size of an electronic document (e.g., only documents below or above a certain size are included in the repository 102).

In addition, the character management system can generate the repository 102 based on one or more time periods. For instance, the character management system can limit electronic documents in the repository 102 to electronic documents created after a certain date. For example, the character management system can limit the repository 102 to social media posts created within the past month (or day, week, or year). Similarly, the character management system can populate the repository 102 with electronic documents that correspond to a time period of a certain event (e.g., within one week of an election, sporting event, or other identified event).

Upon generating the repository 102, in one or more embodiments, the character management system identifies one or more standardized image characters. For instance, as illustrated in FIG. 1, the character management system identifies the first standardized image character 106 and the second standardized image character 108 contained within electronic documents 104d and 104n, respectively. The character management system can identify any type or kind of standardized image character, including, for example, emoji represented by Unicode code points.

Moreover, as discussed in greater detail below, the character management system can identify standardized image characters generated across different platforms, utilizing different code bases, reflecting different numbers of code points, including any variety of variant or optional characters, utilizing different encoding structures, or utilizing different syntaxes. Thus, for example, the character management system can parse the repository 102 (and the electronic documents 104a-104n) and identify (e.g., index, gather, or flag) standardized image characters from different platforms (e.g., iOS, Android, or Windows), code bases (e.g., Python or Java), encodings (e.g., UTF-8, UTF-16, or UTF-32), or optional characters (e.g., skin tone options, width joiner characters, or variant selector characters).

In addition, the character management system can identify standardized image characters utilized in conjunction with other characters (e.g., numbers, text, or other characters). For example, FIG. 1 illustrates that the character management system identifies the second standardized image character 108 as part of a tag (i.e., hashtag) containing additional text. Thus, the character management system can identify standardized image characters in isolation or in conjunction with surrounding characters.

Similarly, the character management system can identify any number or combination of standardized image characters. For instance, the character management system can identify multiple standardized image characters utilized in sequence (e.g., #☺☺☺). Similarly, the character management system can identify multiple standardized image characters utilized in conjunction with other characters (e.g., #hahaha ☺☺☺). The character management system can also identify the context (i.e., surrounding characters and usage) with regard to standardized image characters.

As mentioned previously, in one or more embodiments, the character management system utilizes one or more natural language processing algorithms to identify contextual meaning with regard to one or more standardized image characters. Specifically, as illustrated with regard to the embodiment of FIG. 1, the character management system utilizes a word to vector algorithm 110. In particular, the character management system provides the electronic documents 104a-104n reflected in the repository 102 as input to the word to vector algorithm 110. Moreover, the character management system (via the word to vector algorithm 110) reviews the text of the electronic documents 104a-104n within the repository 102 and predicts the context around a particular word or standardized image character. If the character management system (via the word to vector algorithm 110) predicts the context incorrectly, then it adjusts its operating parameters to produce a better prediction in the next iteration. The character management system utilizes this training process to learn a contextual meaning with regard to standardized image characters.

For instance, in one or more embodiments, the character management system can utilize the word to vector algorithm 110 to generate a representational vector corresponding to each standardized image character within the repository 102. Moreover, the character management system can utilize the word to vector algorithm 110 to generate a semantic map. Indeed, as illustrated, the character management system generates a semantic map 120 utilizing the word to vector algorithm 110.

As used herein, the term "semantic map" refers to a metric space where distance in the metric space represents semantic similarity. In particular, the term "semantic map" includes a metric space with defined distances where representations of semantic symbols (i.e., symbols with meaning, such as words, standardized image characters, tags, other digital images, etc.) are embedded such that a smaller distance exists between similar symbols than between symbols that are less similar. For example, with regard to FIG. 1, the character management system embeds standardized image characters into a 100-dimensional space of floating point numbers.

More specifically, in one or more embodiments, the character management system utilizes a Gensim topic modeling algorithm—a specific implementation of a word to vector algorithm. In particular, in one or more embodiments the character management system utilizes the Gensim topic modeling algorithm to learn the floating point numbers of a semantic map. For instance, in one or more embodiments, the character management system utilizes a skip-gram functionality of the Gensim topic modeling algorithm to predict the context around standardized image characters and to train the character management system to accurately identify contextual meaning. In this manner, in one or more embodiments, the character management system learns contextual meaning from the repository 102 and generates the semantic map 120 (e.g., a 100-dimensional representation for words and standardized image characters).

Because the semantic map 120 identifies a contextual meaning of standardized image characters (i.e., based on distance in a metric space), the character management system can utilize the semantic map 120 to identify other words, standardized characters, tags, or other symbols with similar meanings. In particular, in one or more embodiments, the character management system can identify contextual meaning by identifying semantic symbols in close proximity to standardized image characters within a semantic map. For instance, the character management system can utilize the semantic map 120 to determine that a standardized image character in the shape of a thumbs up has a contextual meaning corresponding to the words "awesome," "good," "haha," "great job," "#keepitup," and so forth (e.g., by determining that the thumbs up standardized image character is in close proximity to semantic symbols such as "awesome" and "#keepitup" within the semantic map 120).

In addition to utilizing a semantic map, the character management system can also utilize vectorized representations to determine or refine contextual meaning. For example, because the word to vector algorithm generates a vectorized representation with regard to contextual meaning, the character management system can identify a difference in contextual meaning between two (or more) symbols utilizing vectorized representations.

For instance, utilizing vector algebraic operations, the character management system can identify distinguishing characteristics between two standardized image characters. For example, the character management system can identify the difference between a blue heart and a red heart utilizing the algebraic difference between the vector representation of the blue heart and the vector representation of the red heart. For instance, in one or more embodiments, the character management system can identify a difference in contextual meaning between a blue heart and a red heart by subtracting the vector representation of the blue heart and the vector representation of the red heart to produce a contextual meaning of, for example, "duke," "#bleedblue," "#autismawarenessday," and so forth.

Accordingly, with regard to standardized image characters with similar contextual meanings, the character management system can identify a more particular contextual meaning. For instance, as just described, the character management system can utilize algebraic operators to identify particular distinguishing characteristics of a standardized image character (e.g., by utilizing algebraic expressions with regard to the vector representation corresponding to the standardized image character).

Figure 2:
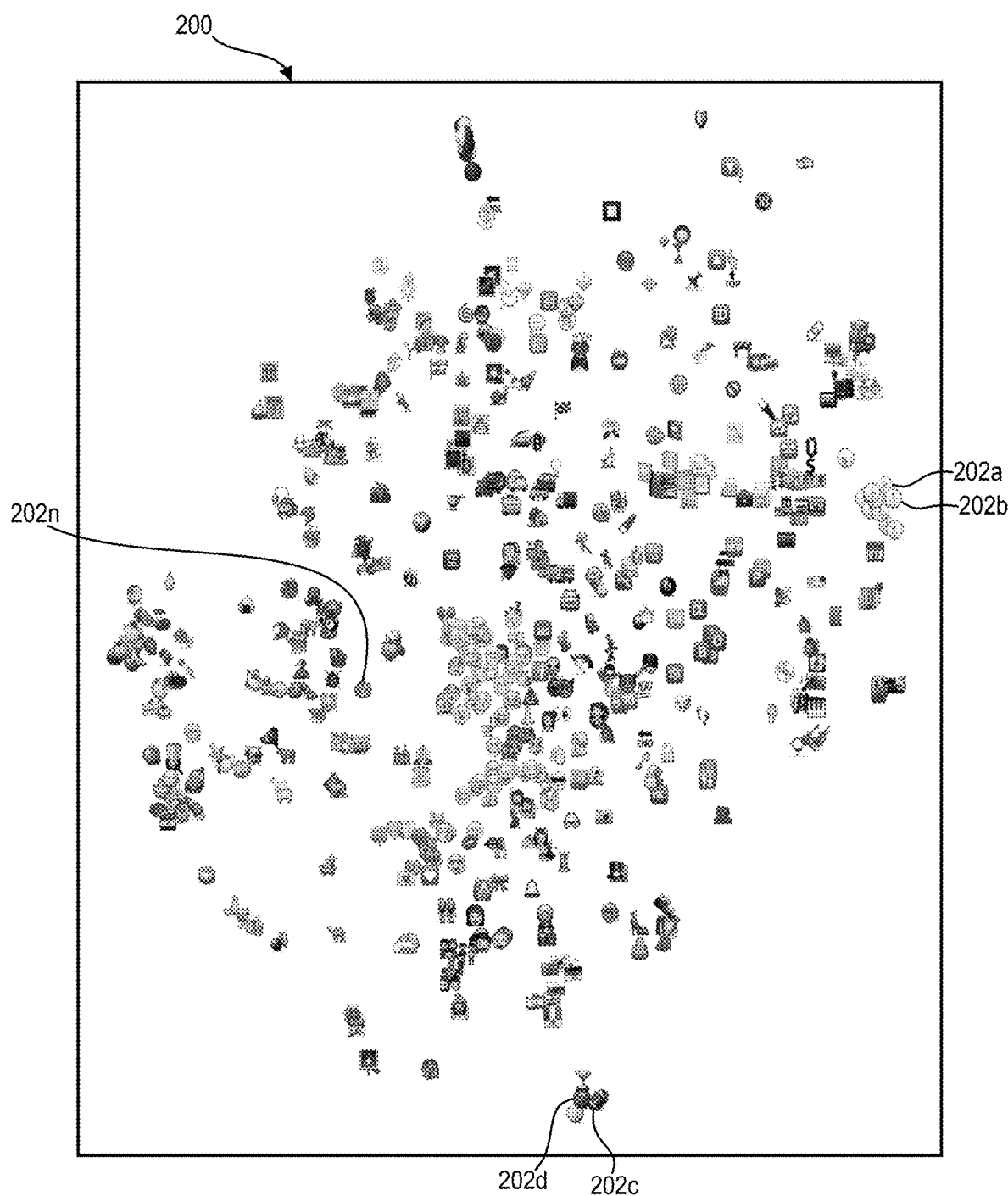
FIG. 2 illustrates a representation of a semantic map for identifying a contextual meaning in accordance with one or more embodiments.

Although the semantic map 120 is a 100-dimensional representation, the character management system can generate or utilize semantic maps of any type or variety. For example, FIG. 2 illustrates a representation of a two-dimensional semantic map 200 in accordance with one or more embodiments. In particular, the semantic map 200 illustrates a plurality of standardized image characters 202a-202n distributed according to their similarity across a metric space.

More particularly, the semantic map 200 illustrates a plurality of standardized image characters 202a-202n wherein the distance between each standardized image character represents semantic similarity. For example, the semantic map 200 illustrates that a first time standardized image character 202a and a second time standardized image character 202b are in close proximity on the semantic map 200 (i.e., because the standardized image characters 202a, 202b have similar contextual meaning). Similarly, a first sports standardized image character 202c and a second sports standardized image character 202d are in close proximity on the semantic map 200. Conversely, a pumpkin standardized image character 202n is relatively isolated from other standardized image characters within the semantic map 200.

Although the semantic map 200 of FIG. 2 includes representations of a plurality of standardized image characters, it will be appreciated that a semantic map can also include other characters (e.g., words, images, tags, numbers, a combination of standardized image characters and words). For example, in one or more embodiments, the character management system generates a semantic map that includes words, standardized image characters, tags (e.g., hashtags), images and/or other semantic symbols. In this manner, one or more embodiments of the character management system can identify semantic similarity (or difference) between standardized image characters and other words, images, tags, and standardized image characters.

Although FIG. 1 and FIG. 2 illustrate representations of semantic maps that define a contextual meaning of one or more standardized image characters, it will be appreciated that the character management system can identify a contextual meaning utilizing other tools. For instance, rather than (or in addition to) producing a semantic map, the character management system can produce a database that identifies meanings of standardized image characters (e.g., a database of words or symbols closest in meaning to one or more standardized image characters).

Figure 3B:
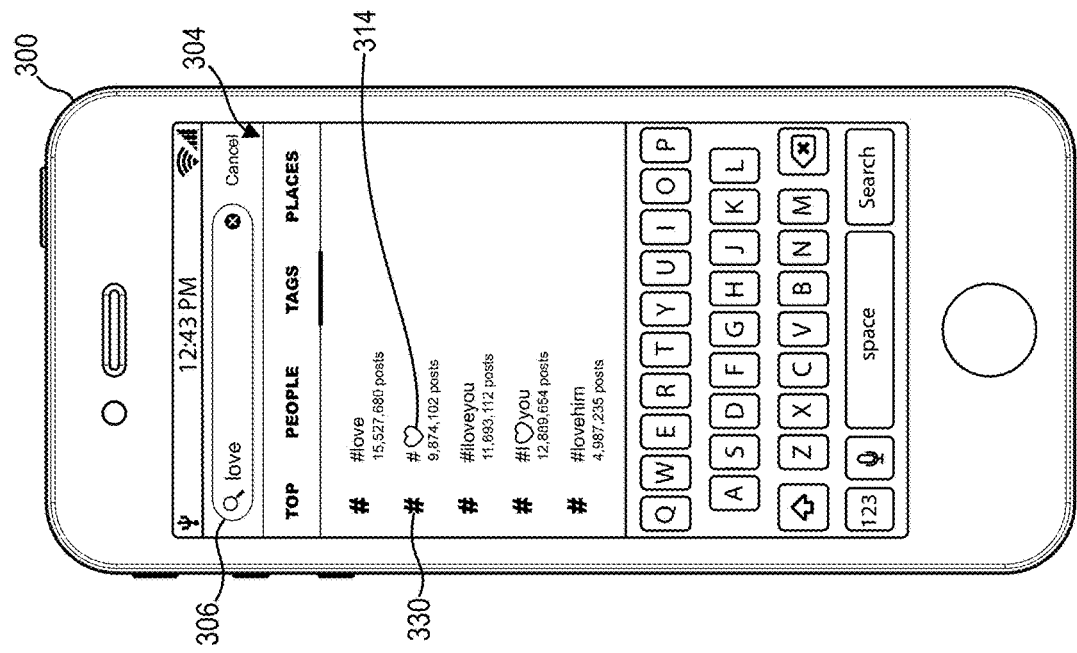
FIG. 3B illustrates a representation of the user interface of FIG. 3A displaying search results including standardized image characters in accordance with one or more embodiments.

Regardless of the particular means of identifying or storing contextual meaning, upon identifying contextual meaning corresponding to one or more standardized image characters, in one or more embodiments the character management system can utilize the contextual meaning to identify, search, define, recommend, or otherwise support standardized image characters within a computerized system. For example, FIGS. 3A-3C illustrate searches involving one or more standardized image characters in accordance with one or more embodiments of the character management system.

Figure 3A:
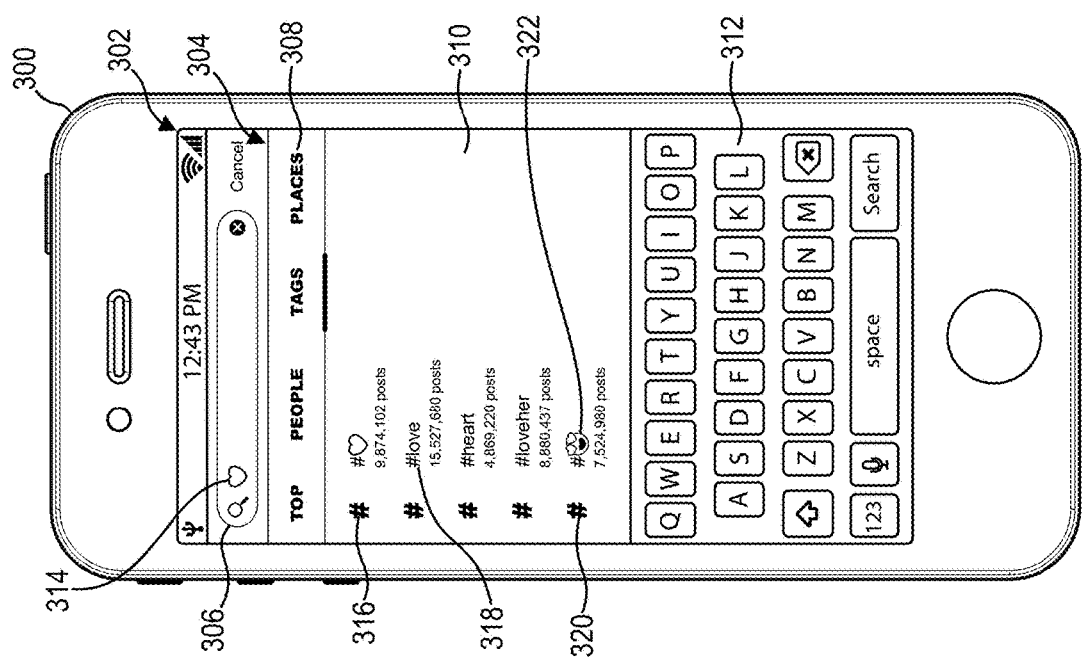
FIG. 3A illustrates a representation of a computing device displaying a user interface for performing a search using standardized image characters in accordance with one or more embodiments.
Figure 3C:
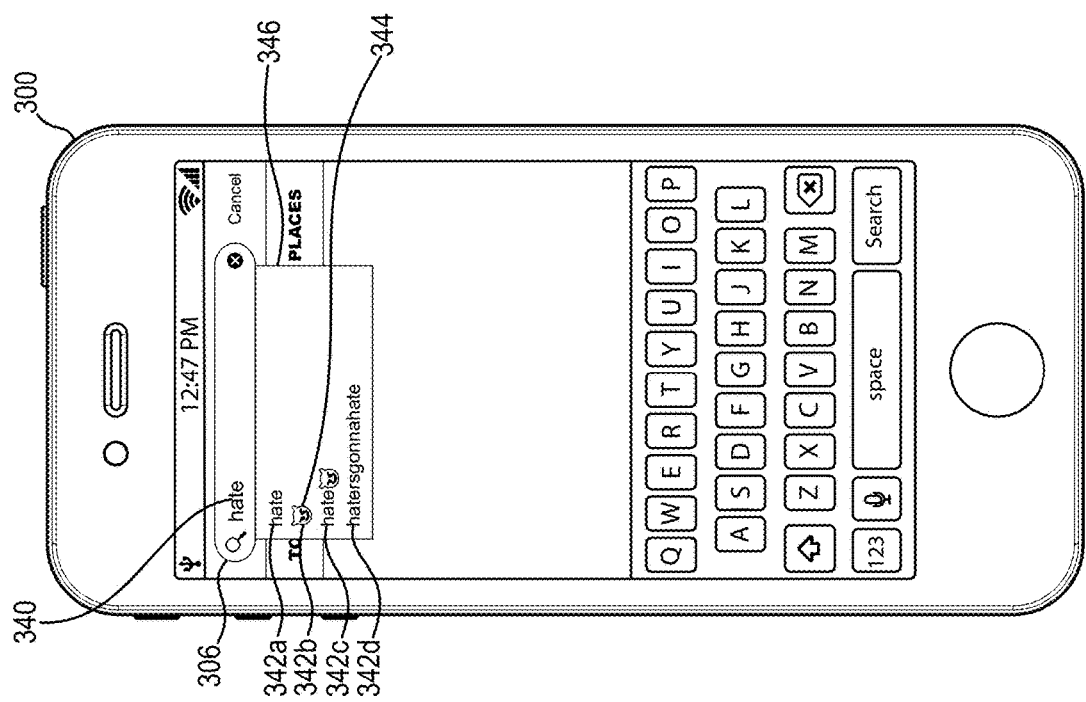
FIG. 3C illustrates a representation of the user interface of FIG. 3A displaying suggested search terms, including standardized image characters, in accordance with one or more embodiments.

In particular, FIG. 3A illustrates a computing device 300 with a display screen 302 displaying a user interface 304. The user interface 304 is operable to display a variety of digital content with regard to a plurality of users of a social media system. In particular, as shown, the user interface 304 is configured to display a search bar 306, a target content bar 308, a results display area 310, and a character input area 312 (among other elements).

The search bar 306 is operable to detect user interaction and receive user input of one or more characters. Moreover, the search bar 306 is configured to display one or more characters received via user input. For instance, a user can select one or more characters via user interaction with the character input area 312 in conjunction with interaction with the search bar 306, and the character management system can receive the selected one or more characters and display them via the search bar 306. For example, with regard to the search bar 306, as shown in FIG. 3A, the character management system has received user input of a heart standardized image character 314 and presented the heart standardized image character 314 via the search bar 306.

As illustrated in FIG. 3A, the user interface 304 also includes the target content bar 308. The target content bar 308 displays categories of digital content (i.e., varieties of target electronic documents) that a user can search via the character management system. For instance, with regard to the embodiment of FIG. 3A, the target content bar 308 contains options for "People" (i.e., search user names, titles, or profiles), "Tags" (i.e., search hashtags associated with social media posts, comments, or digital content), "Places" (i.e., search information associated with particular places), and "Top," (i.e., search top results for people and tags).

Although the embodiment of FIG. 3A illustrates particular categories of target electronic documents (e.g., "People," "Tags," or "Places"), it will be appreciated that the character management system can search and provide search results with regard to other types or varieties of target electronic documents in addition to those illustrated in FIG. 3A. For instance, the character management system can search social media posts, images, web pages, word processing documents, spreadsheets, databases, or any other type of electronic document.

The character management system can identify target electronic documents to search based on user interaction with the target content bar 308. For instance, based on user interaction with the target content bar 308, the character management system is set to search "Tags" (e.g., hashtags associated with social media posts, comments, or digital content). In particular, the character management system searches tags based on the characters (i.e., search query) entered into the search bar 306.

Moreover, the character management system can display one or more search results (i.e., results from the search query) via the results display area 310. In particular, the results display area 310 can be configured to display a variety of representations of one or more electronic documents as search results. For instance, the results display area 310 can display representations of one or more web pages, one or more tags, one or more social media posts, or one or more other electronic documents. More specifically, the results display area 310 can display search results with regard to the search query entered into the search bar 306. Thus, as discussed in greater detail below, with regard to the embodiment of FIG. 3A, the results display area 310 provides a plurality of results representations (e.g., results representations 316-320) based on the heart standardized image character 314 provided as a search query with regard to the search bar 306.

To search (or locate, flag, analyze, recommend, or otherwise support) standardized image characters, one or more embodiments of the character management system identify the standardized image characters within one or more electronic documents. In particular, in one or more embodiments, the character management system generates an index of standardized image characters contained within a repository of electronic documents.

For example, as illustrated in FIG. 3A, the character management system conducts a search across tags (e.g., hashtags) for standardized image characters corresponding to the heart standardized image character 314. To search the tags, in one or more embodiments, the character management system generates an index of the tags (e.g., an index of the tags and corresponding digital content, such as images, text, or comments), including tags containing standardized image characters. The character management system can utilize the index to identify results from search query entered with regard to the search bar 306.

The indexing process, however, is complicated by the fact that tags and/or standardized image characters are often generated and supported utilizing a variety of platforms and code bases, which results in a variety of encoding expressions, code points, variant forms, and pattern matching differences. For example, emoji expressed in Unicode may be expressed in a variety of encodings (e.g., UTF-8, UTF-16, UTF-32). Moreover, different code bases (e.g., Objective-C, Java, Python) utilize different encodings to express emoji. For example, Objective-C utilizes UTF-16, which is a complex encoding that utilizes surrogate pairs with regard to some emoji.

Similarly, different code bases utilize different syntaxes. For example, Unicode escaping sequences (i.e., sequences representing Unicode characters) work subtly differently across codebases. Accordingly, standardized image characters generated utilizing different code bases can have different escaping sequences.

In addition, in Unicode, emoji are defined according to code points (i.e., numbers identifying the particular emoji). Many emoji, however, consist of multiple code points. For example, flag emoji consist of two code points. Thus, to identify some standardized image characters, it is necessary to accommodate and identify multiple different code points.

Moreover, different platforms can express emoji in different variant forms. For example, a heart emoji in iOS consists of one code point corresponding to the heart followed by a variant selector code point that identifies a particular glyph to represent the heart.

Furthermore, more recent emoji require even additional optional characters. For example, recent emoji representing different family arrangements are implemented as separate Unicode code points for each member of the family, joined together with a zero-width joiner character. Accordingly, some family emoji are implemented with seven Unicode code points that define each member of the family.

In addition, some platforms have pattern matching differences. For example, different platforms have different allowed characters that will match when utilizing a regular expression (e.g., "/w" has different meaning within different code bases).

As mentioned previously, however, one or more embodiments of the character management system account for such variability and complications in standardized image characters, and identify and utilize standardized image characters across multiple platforms and code bases. In particular, in one or more embodiments, the character management system utilizes one or more regular expression to identify standardized image characters or tags (e.g., hashtags) containing standardized image characters across platforms and code bases.

For example, in one or more embodiments, the character management system accesses a record of available standardized image characters and corresponding code points. In particular, in one or more embodiments, the character management system accesses a third-party data file containing available standardized image characters and code points. For instance, in one or more embodiments, the character management system accesses the TR51 Draft Technical Report and corresponding data files containing a list of available emoji and code point ranges.

In one or more embodiments, the character management system utilizes a script to parse code points out of the record of available standardized image characters. In particular, the character management system utilizes a script that parses code points and constructs a minimal regular expression using character ranges corresponding to the available standardized image characters. In this manner, the character management system can identify and support emoji that consist of multiple code points. Moreover, the character management system can identify and support emoji in different variant forms and emoji with additional optional characters.

Moreover, in one or more embodiments, the character management system detects and identifies new, available standardized image characters. In particular, in one or more embodiments the character management system accesses an updating record of available standardized image characters. The character management system can detect changes to the updating record of available standardized image characters. Moreover, the character management system can utilize a script to parse new code points and modify the regular expression to reflect character ranges corresponding to the new available standardized image characters. In this manner, the character management system can recognize and identify new standardized image characters as they become available.

A record of available standardized image characters, however, may not reflect all differences for standardized image characters across platforms and code bases. For example, as discussed above, some code bases represent certain characters utilizing surrogate pairs that may not be represented in a record of available standardized image characters (and cannot be captured as a regular expression character ranges). Accordingly, in one or more embodiments, the character management system must adjust the regular expression to include non-range surrogate pairs.

For example, in narrow Python builds, four-byte Unicode escapes are not allowed as regular expression character ranges. Thus, instead of matching a standardized image character block using a simple expression, such as,

[\U0001F600-\U0001F64F]

the character management system utilizes a non-range surrogate pair match, such as, (\uD83D[\uDE00-\uDE4F]).

Similarly, as mentioned above, different code bases have different syntaxes (e.g., Unicode escaping varies slightly from code base to code base). In one or more embodiments, the character management system utilizes patterns to identify and account for different syntaxes. For instance, with regard to Java 7 and astral plan Unicode characters (i.e., high code point ranges), the character management system can match U+0001F600 with the pattern \x{1F600}. Similarly, Objective-C supports Unicode escaping for astral plane characters in strings with \U0001F600, but the syntax does not work in the ASCII range; accordingly, the character management system utilizes a mixture of another \xf6 syntax (as illustrated below).

Moreover, as mentioned above, different code bases have pattern matching differences. For example, the effect of "\w" varies in implementing matching patterns for some emoji across code bases. Specifically, in Unicode, the UTS 18 technical standard recommends that "\w" matches digits, alphabetical characters, the general category of "mark," and two categories called "Connector Punctuation" and "Join Control." The latter two categories are used in some emoji but programming languages implement them differently. Objective-C on iOS 8.3 will match "\w" against U+200d and U+fe0f. Python matches neither. Peculiarly, the Java JRE (8.0) matches neither while the Android Java runtime (API level 16) matches only U+fe0f. Thus, depending on the platform, the character management system augments the allowed character for each particular code base set to include special non-printable characters.

By parsing a record of available standardized image characters, finding character variations, and accounting for language differences the character management system can generate regular expressions that identify and support standardized image characters across platforms and code bases. For instance, in one or more embodiments, the character management system generates the following regular expression to identify emoji within tags across platforms and codebases:

Python 2.7
u"(?<!&)#(\w|(?:
[xA9\xAE\u203C\u2049\u2122\u2139\u2194-\u2199\u21A9\u21AA\u231A\u231B\u2328\u2388\u23CF\u23E9-\u23F3 \u23F8-\u23FA\u24C2\u25AA\u25AB\u25B6\u25C0\u25FB-\u25FE\u2600-
\u2604\u260E\u2611\u2614\u2615\u2618\u2611:0\u2620\u2622\u2623\u2626\u262A\u262E\u262F\u2 638-\u263A\u2648-
\u2653\u2660\u2663\u2665\u2666\u2668\u267B\u267F\u2692-
\u2694\u2696\u2697\u2699\u269B\u269C\u26A0\u26A1\u26AA\u26AB\u26B0\u26B1\u26BD\u26B E\u26C4\u26C5\u26C8\u26CE\u26CF\u26D1\u26D3\u26D 4\u26E9\u26EA\u26F0-\u26F5\u26F7-
\u26FA\u26FD\u2702\u2705\u2708-
\u270D\u270F\u2712\u2714\u2716\u271D\u2721\u2728\u2 733\u2734\u2744\u2747\u274C\u274E\u2 753-\u2755\u2757\u2763\u2764\u2795-
\u2797\u27A1\u27B0\u27BF\u2934\u2935\u2B05-\u2B07\u2B1B\u2B1C\u2B50\u2B55\u3030\u303D\u3297\u329911\uD83CruDC04\uDCCF\uDD70\uDD71\uDD7E\uDD7F\uDD8E\uDD91-
\uDD9A\uDE01\uDE02\uDE1A\uDE2RuDE32-\uDE3A\uDE50\uDE51\uDF00-\uDF21\uDF24-\uDF93\uDF96\uDF97\uDF99-\uDF913\uDF9E-\uDFF0\uDFF3-\uDFF5\uDFF7-
\uDFFF11\uD83DruDC00-\uDCFD\uDCFF-\uDD3D \uDD49-\uDD4E\uDD50-\uDD67\uDD6RuDD70\uDD73-\uDD79\uDD87\uDD8A-
\uDD8D\uDD90\uDD95\uDD96\uDDA5\uDDA8\uDDB1\uDDB2\uDDBC\uDDC2-\uDDC4\uDDD1-
\uDDD3\uDDDC-
\uDDDE\uDDE1\uDDE3\uDDEF\uDDF3\uDDFA-\uDE4F\uDE80-\uDEC5\uDECB-\uDED0\uDEE0-\uDEE5\uDEE9\uDEEMuDEEC\uDEF0\uDEF3|\uD83E [\uDD10-\uDD18\uDD80-\uDD84\uDDC0]|(?:
\u20E3|1\u20E3|2\u20E3|3\u20E3|4\u20E3|5\u20E3|6\u20 E3|7\u20E3|8\u20E3|9\u20E3|#\u20E3|\\*\u20E3|\uD83C (?: \uDDE6\uD83C(?:
\uDDEB|\uDFD1|\uDDF8|\uDDF9|\uDDF4|\uDDEE|\uDD F6|\uDDEC|\uDDF7|\uDDF2|\uDDFC|\uDDE8|\uDDFA|\uDDF9|\uDDFF|\uD DEA)\uDDE7\uD83C(?:
\uDDF8|\uDDED|\uDDE9|\uDDE7|\uDDFE|\uDDEA|\uDDFF|\uDDEF|\uD DF2|\uDDF9|\uDDF4|\uDDE6]
\uDDFC|\uDDFB|\uDDF7DDF3|\uDDEC|\uDDEB|\uDDEE|\uDDF6|\uDDF1)|\uDDE8|\uD83C(?:
\uDDF2|\uDDE6|\uDDFB|\uDDEB|\uDDF1|\uDDF3|\uDDFD|\uDDF5|\u DDE8|\uDDF4|\uDDEC|\uDDE9|\uDDF0|\uDDF7|\uDDE E|\uDDFA|\uDDFE|\uDDFF|\uDD ED)|uDDE9|\uD83C(?:
\uDDFF|\uDDF0|\uDDEC|\uDDEF|\uDDF2|\uDDF4|\uDD EA|\uDDEA\uD83C(?:
\uDDE6|\uDDE8|\uDDEC|\uDDF7|\uDDEA|\uDDF9|\uD DFA|\uDDF8|\uDDED)|\uDDEB\uD83C(?:
\uDDF0|\uDDF4|\uDDEF|\uDDEE|\uDDF7|\DDF2) |\uDDEC\uD83C(?: \uDDF6|\uDDEB|\uDDE 6|\uDDF2|\uDDEA|\uDDED|\uDDEE|\uDDF7|\uDDF1|\u DDE9|\uDDF5|\uDDFA|\uDDF9|\uDDEC|\u DDF3|\uDDFC|\uDDFE|\uDDF8"\uDDE7)
|\DDED\uD83C(?: \uDDF7|\uDDF9|\uDDF2|\uDDF3|\uDF0|\uDDFA)|\uDDEE\uD83C(?:
\uDDF4|\uDDE8|\uDDF5|\uDDF3|\uDDE9|\uDDF7|\uDD F6|\uDDE A|\uDDF2|\uDDF1|\uDDF9)|\uDDEF\uD83C(?: \uDDF2|\uDDF5|\uDDEA|\uDDF4)|\uDDF0\uD83C(?:
\uDDED|\uDDFE|\uDDF2|\uDDFF|\uDDEA|\uDDEE|\uD DFC|\uDDEC|\uDDF5|\uDDF7|\uDDF³)|\uDDF1\uD83C(?:
\uDDE6|\uDDFB|\uDDE7|\DDF8|\uDDF7|\DDFE|\uDDE E|\uDDF9|\uDDFA|\uD DF0|\uDDE8)|\uDDF2\uD83C(?:
\uDDF4|\uDDF0|\uDDEC|\uDDFC|\uDDFE|\uDDFB|\uD DF1|\uDD F9|\uDDED|\uDDF6|\uDDF7|DDFA|\uDDFD|\uDDE9|\u DDE8|\uDDF3|\uDDEA|\uDDF8|\uDDE6|\uDDFF|\uDDF 2|\uDDF5|\uDDEB)|\uDDF3|\uD83C(?:
\uDDE6|\uDDF7|\uDDF5|\uDDF1|\uDDE8|\uD DFF|\uDDEE|uDDEA|\uDDEC|\uDDFA|\uDDEB|\uDD F4)|\uDDF4\uD83C\uDDF2|\uDDF5\uD83C (?: \uDDEB|\upDF0|\uDDFC|\uDDF8|\uDDE6|\uDDEC|\uD DFE|\uDDEA|\uDDED|\upDF3|\uDDF¹|\uDDF9|\uDDF7|\u DDF2)|\uDDF6\uD83C\uDDE6|\uDDF7\uD83C(?:
\uDDEA|\uDDF4|\uDDFA|\uD DFC|\uDDF8) |\uDDF8\uD83C(?:
\uDDFB|\uDDF2|\uDDF9|\uDDE6|\uDDF3|\uDDE8|\uDD F1|\uDDE C|\uDDFD|\uDDF0|\uDDE|\uDDE7|\uDDF4|\uDDF8|\uD DED|\uDDE9|\uDDF7|\uDDEF|\uDDFF|\u DDEA|\uDDFE)|\uDDF9\uD83C(?:
\uDDE9|\uDDEB|\uDDFC|\uDDEF|\uDDFF|\uDDED|\uDDF1|\u DDEC|\uDDF0|\uDDF4|\uDDF9|\uDDE6|\uDDF3|\uDDF 7|\uDDF2|\uDDE8|\uDDFB)|\uDDFA\uD83C(?:\uDDEC|\uDDE6|\uDDE8|\uDDEI|\uDDF2|\uDDFF)|\uDDFB\uD83C(?:\uDDEC|\uDDE8|\uDDEE|\uDDFA|\uDDE6|\uDDEA|\uDDF3)|\uDDFC\uD83C(?:\uDDF8|\uDDEB)|\uDDFD\uD83C\uDDF0|\uDDFE\uD83C(?:\uDDF9|\uDDEA)|\uDDF\uD83C(?:\uDDE6|\uDDF2|\uDDFC))))[\ufe00-\ufe0f\u200d]?)+
Java 7+
"(?<!&)#(\w|[\x{2712},}\\x{2714}\\x{2716}\\x{271d}\\x{2721}\\x{2728}\\x{2733}\\x{2734}\\x{2744}\\x{2747}\\x{274c}\\x{274e}\\x{2753}-\\x{2755}\\x{2757}\\x{2763}\\x{2764}\\x{2795}-\\x{2797}\\x{27a1}\\x{27b0}\\x{27bf}\\x{2934}\\x{2935}\\x{2b05}-\\x{2b07}\\x{2b1b}\\x{2b1c}\\x{2b50}\\x{2b55}\\x{3030}\\x{303d}\\x{1f004}\\x{1f0cf}\\x{1f170}\\x{1f171}\\x{1f17e}\\x{1f17f}\\x{1f18e}\\x{1f191}-\\x{1f19a}\\x{1f201}\\x{1f202}\\x{1f21a}\\x{1f22f}\\x{1f232}-\\x{1f23a}\\x{1f250}\\x{1f251}\\x{1f300}-\\x{1f321}\\x{1f324}-\\x{1f393}\\x{1f396}\\x{1f397}\\x{1f399}-\\x{1f39b}\\x{1f39c}-\\x{1f3f0}\\x{1f3f3}-\\x{1f3f5}\\x{1f3f7}-\\x{1f4fd}\\x{1f4ff}-\\x{1f53d}\\x{1f549}-\\x{1f54e}\\x{1f550}-\\x{1f567}\\x{1f56f}\\x{1f570}\\x{1f573}-\\x{1f579}\\x{1f587}\\x{1f58a}-\\x{1f58d}\\x{1f590}\\x{1f595}\\x{1f596}\\x{1f5a5}\\x{1f5a8}\\x{1f5b1}\\x{1f5b2}\\x{1f5bc}\\x{1f5c2}-\\x{1f5c4}\\x{1f5d1}-\\x{1f5d3}\\x{1f5dc}-\\x{1f5de}\\x{1f5e1}\\x{1f5e3}\\x{1f5ef}\\x{1f5f3}\\x{1f5fa}-\\x{1f64f}\\x{1f680}-\\x{1f6c5}\\x{1f6cb}-\\x{1f6d0}\\x{1f6e0}-\\x{1f6e5}\\x{1f6e9}\\x{1f6eb}\\x{1f6ec}\\x{1f6f0}\\x{1f6f3}\\x{1f910}-\\x{1f918}\\x{1f980}-\\x{1f984}\\x{1f9c0}\\x{3297}\\x{3299}\\x{a9}\\x{ae}\\x{203c}\\x{2049}\\x{2122}\\x{2139}\\x{2194}-\\x{2199}\\x{21a9}\\x{21aa}\\x{231a}\\x{231b}\\x{2328}\\x{2388}\\x{23cf}\\x{23e9}-\\x{23f3}\\x{23f8}-\\x{23fa}\\x{24c2}\\x{25aa}\\x{25ab}\\x{25b6}\\x{25c0}\\x{25fb}-\\x{25fe}\\x{2600}-\\x{2604}\\x{260e}\\x{2611}\\x{2614}\\x{2615}\\x{2618}\\x{261d}\\x{2620}\\x{2622}\\x{2623}\\x{2626}\\x{262a}\\x{262e}\\x{262f}\\x{2638}-\\x{263a}\\x{2648}-\\x{2653}\\x{2660}\\x{2663}\\x{2665}\\x{2666}\\x{2668}\\x{267b}\\x{267f}\\x{2692}-\\x{2694}\\x{2696}\\x{2697}\\x{2699}\\x{269b}\\x{269c}\\x{26a0}\\x{26a1}\\x{26aa}\\x{26ab}\\x{26b0}\\x{26b1}\\x{26bd}\\x{26be}\\x{26c4}\\x{26c5}\\x{26c8}\\x{26ce}\\x{26cf}\\x{26d1}\\x{26d3}\\x{26d4}\\x{26e9}\\x{26ea}\\x{26f0}-\\x{26f5}\\x{26f7}-\\x{26fa}\\x{26fd}\\x{2702}\\x{2705}\\x{2708}-\\x{270d}\\x{270f}]
\\x{23}\\x{20e3}|\\x{2a}\\x{20e3}|\\x{30}\\x{20e3}|x{31}\\x{20e3}\\x{32}\\x{20e3}\\x{33}\\x{20e3}|\\x{34}\\x{20e3}|\\x{35}\\x{20e3}|\\x{36}\\x{20e3}|\\x{37}\\x{20e3}|\\x{38}\\x{20e3}\\x{39}\\x{20e3}|\\x{1f1e6}[\\x{1f1e8}-\\x{1f1ec}\\x{1f1ee}\\x{1f1f1}\\x{1f1f2}\\x{1f1f4}\\x{1f1f6}-\\x{1f1fa}\\x{1f1fc}\\x{1f1fd}\\x{1f1ff}]|\\x{1f1e7}[\\x{1f1e6}\\x{1f1e7}\\x{1f1e9}-\\x{1f1ef}\\x{1f1f1}-\\x{1f1f4}\\x{1f1f6}-\\x{1f1f9}\\x{1f1fb}\\x{1f1fc}\\x{1f1fe}\\x{1f1ff}]|\\x{1f1e8}[\\x{1f1e6}\\x{1f1e8}[\\x{1f1e9}\\x{1f1eb}-\\x{1f1ee}\\x{1f1f0}-\\x{1f1f5}\\x{1f1f7}\\x{1f1fa}-\\x{1f1ff}]\\x{1f1e9}]
|\\x{1f1ea}\\x{1f1ec}\\x{1f1ef}|\\x{1f1f0}\\x{1f1f2}\\x{1f1f4}\\x{1f1ff}]
\\x{1f1ea}\\x{1f1e6}\\x{1f1e8}\\x{1f1ea}[\\x{1f1ec}\\x{1f1ed}\\x{1f1f7}-\\x{1f1fa}\\x{1f1eb}[\\x{1f1ee}-\\x{1f1f0}\\x{1f1f2}\\x{1f1f4}\\x{1f1f7}]\\x{1f1ec}[\\x{1f1e6}\\x{1f1e7}\\x{1f1e9}-\\x{1f1ee}\\x{1f1f1}-\\x{1f1f3}\\x{1f1f5}-\\x{1f1fa}\\x{1f1fc}\\x{1f1fe}]\\x{1f1ed}[\\x{1f1f0}\\x{1f1f2}\\x{1f1f3}\\x{1f1f7}\\x{1f1f9}\\x{1f1fa}]|\\x{1f1ee}[\\x{1f1e8}-\\x{1f1ea}\\x{1f1f1}-\\x{1f1f4}\\x{1f1f6}-\\x{1f1f9}]\\x{1f1ef}[\\x{1f1ea}\\x{1f1f2}\\x{1f1f4}\\x{1f1f5}]\\x{1f1f0}[\\x{1f1ea}\\x{1f1ec}-\\x{1f1ee}\\x{1f1f2}\\x{1f1f3}\\x{1f1f5}\\x{1f1f7}\\x{1f1fc}\\x{1f1fe}\\x{1f1ff}]\\x{1f1f1}]\\x{1f1e6}-\\x{1f1e8}\\x{1f1ee}\\x{1f1f0}\\x{1f1f7}-\\x{1f1fb}\\x{1f1fe}]\\x{1f1f2}\\x{1f1e6}\\x{1f1e8}-\\x{1f1ed}\\x{1f1f0}-\\x{1f1ff}]
\\x{1f1e6}\\x{1f1e8}\\x{1f1ea}-\\x{1f1ec}\\x{1f1ee}\\x{1f1f1}\\x{1f1f4}\\x{1f1f5}]\\x{1f1f7}]\\x{1f1ea}\\x{1f1ed}-\\x{1f1f0}-\\x{1f1f3}\\x{1f1f7}\\x{1f1f9}\\x{1f1fc}\\x{1f1fe}]\\x{1f1e6}[\\x{1f1ea}\\x{1f1f7}]]
\\x{1f1ea}\\x{1f1f4}\\x{1f1f8}\\x{1f1fa}\\x{1f1fc}]\\x{1f1f8}]\\x{1f1e6}-\\x{1f1ea}\\x{1f1ec}-\\x{1f1f4}\\x{1f1f7}-\\x{1f1f9}\\x{1f1fb}\\x{1f1fd}-\\x{1f1ff}]\\x{1f1f9}]
\\x{1f1e}\\x{1f1e8}\\x{1f1e9}\\x{1f1eb}-\\x{1f1ed}\\x{1f1ef}-\\x{1f1f4}\\x{1f1f7}\\x{1f1f9}\\x{1f1fb}\\x{1f1fc}\\x{1f1ff}]\\x{1f1fa}]
\\x{1f1e6}\\x{1f1ec}\\x{1f1f2}\\x{1f1f8}[\\x{1f1e}\\x{1f1ff}]\\x{1f1fb}]
\\x{1f1e6}\\x{1f1e8}\\x{1f1ea}\\x{1f1ec}\\x{1f1ee}[\\x{1f1eb}\\x{1f1fc}[\\x{1f1eb}\\x{1f1f8}]
\\x{1f1fd}\\x{1f1f0}]\\x{1f1fe}[\\x{1f1ea}\\x{1f1f9}]
\\x{1f1ff}[\\x{1f1e6}\\x{1f1f2}\\x{1f1fc}]+"
Objective-C
"\U00002712\U00002714\U00002716\U0000271d\U00002721\U00002728\U00002733\U00002734\U00002744\U00002747\U0000274c\U0000274e\U00002753-\U00002755\U00002757\U00002763\U00002764\U00002795-\U00002797\U000027a1\U000027b0\U000027\U00002934\U00002935\U00002b05-\U00002b07\U00002b1b\U00002b1c\U00002b50\U00002b55\U00003030\U0000303d\U0001f004\U0001f0cf\U0001f170\U0001f171\U0001f17e\U0001f17f\U0001f18e\U0001f191-\U0001f19a\U0001f201\U0001f202\U0001f21a\U0001f22f\U0001f232-\U0001f23a\U0001f250\U0001f251\U0001f300-\U0001f321\U0001f324-\U0001f393\U0001f396\U0001f397\U0001f399-\U0001f39b\U0001f39e-\U0001f3f0\U0001f3f3-\U0001f3f5\U0001f3f7-\U0001f4fd\U0001f4ff-\U0001f53d\U0001f549-\U0001f54e\U0001f550-\U0001f567\U0001f56f\U0001f570\U0001f573-\U0001f579\U0001f587\U0001f58a-\U0001f58d\U0001f590\U0001f595\U0001f596\U0001f5a5\U0001f5a8\U0001f5b1\U0001f5b2\U0001f5bc\U0001f5c2-\U0001f5c4\U0001f5d1-\U0001f5d3\U0001f5dc-\U0001f5de\U0001f5e1\U0001f5e3\U0001f5ef\U0001f5f3\U0001f5fa-\U0001f64f\U0001f680-

\U0001f6c5\U0001f6cb-\U0001f6d0\U0001f6e0-\U0001f6e5\U0001f6e9\U0001f6eb\U0001f6ec\U0001f6f0\U0001f6f3\U0001f910-\U0001f918\U0001f980-\U0001f984\U0001f9c0\U00003297\U00003299\U000000a9\U000000ae\U0000203c\U00002049\U00002122\U00002139\U00002194-\U00002199\U000021a9\U000021aa\U0000231a\U0000231b\U00002328\U00002388\U000023cf\U000023e9-\U000023f3\U000023f8-\U000023fa\U000024c2\U000025aa\U000025ab\U000025b6\U000025c0\U000025fb-\U000025fe\U00002600-\U00002604\U0000260e\U00002611\U00002614\U00002615\U00002618\U0000261d\U00002620\U00002622\U00002623\U00002626\U0000262a\U0000262e\U0000262f\U00002638-\U0000263a\U00002648-\U00002653\U00002660\U00002663\U00002665\U00002666\U00002668\U0000267b\U0000267f\U00002692-\U00002694\U00002696\U00002697\U00002699\U0000269b\U0000269b\U000026a0\U000026a1\U000026aa\U000026ab\U000026b0\U000026b1\U000026bd\U000026be\U000026c4\U000026c5\U000026c8\U000026ce\U000026cf\U000026d1\U000026d3\U000026d4\U000026e9\U000026ea\U000026f0-\U000026f5\U000026f7-\U000026fa\U000026fd\U00002702\U00002705\U00002708-\U0000270d\U0000270f]|[#]\U000020e3|[#]\U000020e3|[0]\U000020e3|[1]\U000020e3|[2]\U000020e3|[3]\U000020e3|[4]\U000020e3|[5]\U000020e3|[6]\U000020e3|[7]\U000020e3|[8]\U000020e3|[9]\U000020e3|\U0001f1e6[\U0001f1e8-\U0001f1ec\U0001f1ee\U0001f1f1\U0001f2\U0001f1f4\U0001f1f6-\U0001f1fa\U0001f1fc\U0001f1fd\U0001f1ff]|\U0001f1e7[\U0001f1e6\U0001f1e7\U0001f1e9-\U0001f1ef\U0001f1f1-\U0001f1f4\U0001f1f6-\U0001f1f9\U0001f1fb\U0001f1fc\U0001f1fe\U0001f1ff]\U0001f1e8[\U0001f1e6\U0001f1e\U0000 1f1e\U0001f1eb-\U0001f1ee\U0001f1f0-\U0001f1f5\U0001f1f7\U0001f1fa-\U0001f1ff]\U0001f1e9
[\U0001f1ea\U0001f1ec\U0001f1ef\U0001f1f0\U0001f1f2\U0001f1f4\U0000 1f1ff]\U0001f1ea
[\U0001f1e6\U0001f1e8\U0001f1ea\U0001f1ec\U0001f1ed\U0001f1f7-\U0001f1fa]\U0001f1eb
[\U0001f1ee-\U0001f1f0\U0001f1f2\U0001f1f4\U0001f1f7]\U0001f1ec
[\U0001f1e6\U0001f1e7\U0001f1e9-\U0001f1ee\U0001f1f1-\U0001f1f3\U0001f1f5-\U0001f1fa\U0001f1fc\U0001f1fe]\U0001f1ed
[\U0001f1f0\U0001f1f2\U0001f1f3\U0001f1f7\U000 1f1f9\U0001f1fa]\U0001f1ee[\U0001f1e8-\U0001f1ea\U0001f1f1-\U0001f1f4\U0001f1f6-\U0001f1f9]\U0001f1ef
[\U0001f1ea\U0001f1f2\U0001f1f4\U0001f1f5]
|\U0001f1f0]|\U0001f1ea\U0 001f1ec-\U0001f1ee\U0001f1f2\U0001f1f3
[\U0001f1f5\U0001f1f7\U0001f1fc\U0001f1fe\U0001f1ff]|\U0001f1f1[\U0001f1e6-\U0001f1e8\U0001f1ee\U0001f1f0\U0001f1f7-\U0001f1fb\U0001f1fe]\U0001f1f2
[\U0001f1e6\U0001f1e8-\U0001f1ed\U0001f1f0-\U0001f1ff]|\U0001f1f3
[\U0001f1e6\U0001f1e8\U0001f11ea-\U0001f1ec\U0001f1ee\U0001f1f1\U0001f1f4\U0001f1f5\U0001f1f7\U0001f1fa\U0001f1ff]
\U0001f1f4\U0001f1f2\U0001f1f5
[\U0001f1e6\U0001f1ea-\U0001f1ed\U0001f1f0-\U0001f1f3\U0001f1f7-\U0001f1f9\U0001f1fc\U0001f1fe]
\U0001f1f6\U0001f1e6|\U0001f1f7
[\U0001f1ea\U0001f1f4U000 1f1f8\U0001f1fa\U0001f1fc]
\U0001f1f8[\U0001f1e6-\U0001f1ea\U0001f1ec-\U0001f1f4\U0001f1f7-\U0001f1f9\U0001f1fb\U0001f1fd-\U0001f1ff]|\U0001f1f9
[\U0001f1e6\U0001f1e8\U0001f1c9\U0001f1eb-\U0001f1ed\U0001f1ef-\U0001f1f4\U0001f1f7\U0001f1f9\U0001f1fb\U0001f1fc\U0001f1ff]\U0001f1fa
[\U0001f1c6\U0001f1ec\U0001f1f2\U0001f1f8\U0001f1fe\U0001f1ff]|\U0001f1fb
[\U0001f1e6\U0001f1e8\U0001f1ea\U0001f1ec\U0001f1ee\U0001f1f3\U0001f1fa]|\U0001f1fc
[\U0001f1eb\U0001f1f8]
|\U0001f1fd\U0001f1f0|\U0001f1fe]
\U0001f1ea\U0001f1f9]|\U0001f1ff
[\U0001f1e6\U0001f1f2\U0001f1fc]"

As mentioned previously, in one or more embodiments, the character management system utilizes the regular expressions to parse tags (e.g., hashtags) and then indexes the corresponding digital content by tag. In this manner, the character management system can identify and support standardized image characters across a variety of clients (e.g., Web, Android, and iOS). For instance, in one or more embodiments, the character management system uses the regular expression to link tags in captions and comments with regard to social media posts provided and supported via a variety of client platforms.

It will be appreciated that although the foregoing regular expressions are crafted to parse hashtags and identify emoji expressed in Unicode, the character management system can utilize similar regular expressions to identify standardized image characters with regard to any variety of electronic documents. For example, the character management system can utilize regular expressions to identify one or more standardized image characters with regard to the repository 102. Similarly, the character management system can utilize regular expressions to identify standardized image characters with regard to any electronic document or collection of electronic documents.

Upon identifying standardized image characters in target electronic documents (e.g., creating an index of standardized image characters from a plurality of electronic documents), one or more embodiments of the character management system conduct searches with regard to the standardized image characters. For instance, the character management system can search an index of tags containing standardized image characters and identify those tags that contain a standardized image character that matches the search query provided with regard to the search bar 306.

For example, the character management system can identify a Unicode emoji character entered into the search bar 306 and identify tags containing the Unicode emoji character by traversing an index of tags. Moreover, as just discussed, the character management system can identify tags with the Unicode emoji character regardless of platform, code base, variant character, etc.

Thus, as illustrated, in FIG. 3A, based on user input of the heart standardized image character 314, the character management system can identify electronic documents (e.g., a plurality of tags) containing the heart standardized image character 314. Moreover, the character management system can present for display a representation of the identified electronic documents (e.g., the plurality of tags) in the results display area 310. Indeed, as shown in FIG. 3A, the character management system presents for display result representation 316 in the results display area 310. The result representation 316 reflects tags corresponding to the heart standardized image character 314.

In one or more embodiments, the character management system provides elements in response to a search query that enable further capabilities based on user interaction with the provided elements. For example, the result representation 316 is a selectable element of the user interface 304 that enables the user to obtain additional information with regard to tags corresponding to the result representation 316. In particular, upon user interaction with the result representation 316, the character management system can provide for display social media posts, comments, text, or other digital content corresponding to each tag. In this manner, the character management system enables a user to receive and review the contents of electronic documents corresponding to the search query.

In addition to identifying electronic documents that contain a standardized image character entered into the search bar 306, the character management system can also identify additional electronic documents corresponding to a contextual meaning. In particular, the character management system can identify electronic documents based on a contextual meaning of a standardized image character entered into the search bar 306.

For example, with regard to FIG. 3A, the character management system identifies a plurality of tags based on the contextual meaning of the heart standardized image character 314. In particular, as described above, the character management determines a contextual meaning of the heart standardized image character 314, and then searches electronic documents based on the contextual meaning. Specifically, the character management system determines that the heart standardized image character 314 has a contextual meaning including "love" and identifies tags containing the word "love." Accordingly, the character management system provides for display the result representation 318, wherein the result representation identifies a tag corresponding to a plurality of social media posts (or comments, etc.) containing "#love."

In a similar manner, the character management system can determine that the contextual meaning of the heart standardized image character 314 also corresponds to "heart" and "loveher." Accordingly, as illustrated in FIG. 3A, the character management system identifies tags containing "heart" and "loveher" and presents corresponding results.

The character management system can utilize contextual meaning of standardized image characters provided in a search query to identify electronic documents containing other standardized image characters. In particular, in one or more embodiments, the character management system identifies a contextual meaning corresponding to a standardized image character entered as part of a search query (e.g., with regard to the search bar 306) and the character management system identifies a contextual meaning corresponding to a standardized image character in one or more target electronic documents.

For instance, with regard to FIG. 3A the character management system provides for display a result representation 320 that comprises a heart eyes standardized image character 322. The character management system provides the result representation 320 upon identifying a correspondence between the contextual meaning of the heart standardized image character 314 and the heart eyes standardized image character 322. Specifically, the character management system determines that a contextual meaning of the heart eyes standardized image character 322 comprises "love." Moreover, the character management system determines that a contextual meaning of the heart standardized image character 314 also comprises "love." Based on the identified correspondence, the character management system identifies tags containing the heart eyes standardized image character 322 as a result for the search query prompted by user input of the heart standardized image character 314 with regard to the search bar 306. Moreover, the character management system presents the result representation 320 reflecting the heart eyes standardized image character 322. Thus, the character management system can provide electronic documents containing a second standardized image character in response to a search query containing a first standardized image character by finding a correspondence between the contextual meaning of first standardized image character and the contextual meaning of the second standardized image character.

It will be appreciated that although FIG. 3A illustrates a single standardized image character entered with regard to the search bar 306, the character management system can conduct searches with regard to a search query containing a plurality of standardized image characters. For example, the character management system can conduct a search for both the heart standardized image character 314 and another standardized image character (e.g., the heart eyes standardized image character 322).

For example, in one or more embodiments, the character management system can determine a contextual meaning for each of a plurality of standardized image characters in a search query and conduct a search based on the determined contextual meanings. Moreover, the character management system can identify a correspondence between the contextual meanings of the plurality of standardized image characters in the search query and one or more characters (e.g., words and/or standardized image characters) in one or more target electronic documents. Based on the correspondence, the character management system can provide results from the search query for display (e.g., via the user interface 304).

Additionally or alternatively, in some embodiments the character management system can determine a single contextual meaning with regard to a combination of a plurality of standardized image characters. For instance, using one or more of the methods described above, the character management system can identify a contextual meaning corresponding to a combination of a plurality of standardized image characters (e.g., a contextual meaning of the heart standardized image character 314 combined with the heart eyes standardized image character 322). Accordingly, in one or more embodiments, the character management system can conduct a search based on the contextual meaning of the combination of the plurality of standardized image characters (in addition to, or in place of, conducting a search based on the contextual meaning of each of the individual standardized image characters).

In addition to conducting searches with regard to a plurality of standardized image characters, in one or more embodiments, the character management system can also conduct searches with regard to a combination of standardized image characters and other characters. For example, the character management system can conduct searches for a tag containing both a standardized image character and text (e.g., "#haha☺").

With regard to searches performed for a combination of standardized image characters and other symbols, the character management system can search for the standardized image characters and other symbols in isolation or in combination. For instance, in some embodiments, the character management system identifies a contextual meaning with regard to the combination of the standardized image characters and other symbols (e.g., identifies a contextual meaning of "haha ☺" as combined from a repository of electronic documents). Moreover, the character management system can conduct a search based on the combined contextual meaning.

The character management system can also conduct searches based on the meaning of the standardized image characters and other characters in isolation. For example, the character management system can identify a contextual meaning of the standardized image character in isolation (e.g., ☺). Moreover, the character management system can conduct a search based on the contextual meaning of the standardized image character and conduct a search for the remaining characters (e.g., a search based on the contextual meaning of ☺ and based on the word "haha").

The character management system can also conduct a search for standardized image characters based on a search query that does not include standardized image characters. In particular, in conducting a search for a search query that does not include standardized image characters, the character management system can identify standardized image characters responsive to the search. For example, FIG. 3B illustrates the computing device 300 upon user input of the word "love" in the search bar 306. In particular, the character management system has provided a result representation 330, which comprises the heart standardized image character 314.

Specifically, with regard to the embodiment of FIG. 3B, the character management system conducts a search for the term "love" with regard to a plurality of target electronic documents (i.e., an index of tags). The character management system identifies standardized image characters within the plurality of target electronic documents and further determines a contextual meaning corresponding to the standardized image characters. The character management system can compare the search term (i.e., "love") with the contextual meaning of the standardized image characters within the plurality of target electronic documents. Based on the comparison, the character management system can identify a correspondence between the search term and one or more standardized image characters. In particular, the character management system identifies a correspondence between the search term "love" and the contextual meaning of the heart standardized image character 314. Accordingly, the character management system provides the result representation 330 comprising the heart standardized image character 314 for display within the result display area 310.

Although the results display area 310 portrays a particular set of results in a particular manner with regard to FIGS. 3A-3B, the results display area 310 can be configured to display a variety of results in a variety of different implementations. For example, rather than display a list of a plurality of tags (as shown in FIGS. 3A-3B), the character management system can display (via the results display area 310) a representation of a plurality of web pages (e.g., a title of a web page with highlighted characters from the web page responsive to the search query). Similarly, the results display area 310 can provide for display a plurality of social media posts with characters responsive to the search query (e.g., responsive standardized image characters) emphasized (e.g., highlighted or bolded). Moreover, the results display area 310 can provide for display a plurality of instances of digital cotent (e.g., digital images) tagged with characters (e.g., standardized image characters or text) responsive to the search query.

Additionally, the character management system can vary the order or manner of presentation. For instance, in one or more embodiments, the character management system and the results display area 310 can be configured to display the results based on a degree of relevance. For instance, the results display area 310 can be configured to display the results that best match (e.g., the results with a highest relevance score and/or correspondence score) the search query provided via the search bar 306 within the results display area 310.

In other embodiments, the character management system and the results display area 310 are configured to display result representations that correspond to the largest number of corresponding tags (e.g., display the results representation with the highest number of tags first, followed by the results representation corresponding to the second highest number of tags second). In yet other embodiments, the results display area 310 displays search results based on a popularity measure (e.g., number of views of a social media post or other digital content, a number of comments corresponding to an electronic document, or a number of visits to a web page). In still other embodiments, the results display area 310 is configured to display search results based on a measure of how other users have previously interacted with one or more result representations (e.g., display result representations first that correspond to electronic documents that previous users have selected in response to a particular search query).

Moreover, although FIGS. 3A-3B illustrate searches and results with regard to text and standardized image characters, it will be appreciated that the character management system can also conduct searches and identify results based on other user input. For example, as mentioned previously, the character management system can generate a semantic map that defines contextual meaning with regard to words, standardized image characters, tags, other digital images, or other character or symbols. Accordingly, the character management system can conduct searches and identify search results based on contextual meaning of words, standardized image characters, tags, other digital images, or other character or symbols.

For example, in one or more embodiments, the character management system can conduct searches and identify search results with regard to digital images. For instance, a user can provide a standardized image character (e.g., a mountain standardized image character) as part of a search query. The character management system can determine a contextual meaning of the standardized image character (e.g., "mountain" or "hiking"). Based on the determined contextual meaning, the character management system can identify images that correspond to the search query (e.g., identify images containing mountains or portraying hiking).

For instance, the character management system can utilize a semantic map that contains both images and standardized image characters to determine a correspondence between the standardized image character in the search query and an image (e.g., determine that an image containing a mountain is in close proximity to the mountain standardized image character within a semantic map). Additionally or alternatively, the character management system can conduct a word search for images based on the contextual meaning of the standardized image character.

In a similar manner, the character management system can also identify search results based on a search for an image. For instance, a user can provide a search query that includes a digital image (e.g., a picture of a mountain). In one or more embodiments, the character management system can utilize object recognition technology to identify one or more objects in the digital image (e.g., identify the image of a mountain). The character management system can then conduct a search based on the identified object (e.g., conduct a search for an image of a mountain or the word mountain). The character management system can identify a correspondence between the identified object and a standardized image character (e.g., determine that a mountain image and a mountain emoji are in close proximity on a semantic map). Moreover, the character management system can provide search results that include electronic documents containing the identified standardized image character in response to the search query containing the digital image.

As mentioned previously, the character management system can also provide recommendations with regard to one or more standardized image characters. In particular, the character management system can recommend a standardized image character based on a contextual meaning of the standardized image character. For example, FIG. 3C illustrates recommending a standardized image character as a search term based on the contextual meaning of the standardized image character.

In particular, FIG. 3C illustrates the computing device 300 displaying the user interface 304 upon user input of a search query 340 (i.e., "hate") with regard to the search bar 306. Moreover, in response to entry of the search query 340, the character management system presents for display a listing of recommended search elements 346. Specifically, the character management system presents recommended search terms 342a-342d.

In one or more embodiments, the character management system selects recommended search terms based on contextual meaning of one or more standardized image characters. For example, the character management system can compare a search query with contextual meanings associated with a plurality of standardized image characters. The character management system can identify a correspondence between the search query and one or more contextual meanings associated with one or more standardized image characters. Based on the correspondence, the character management system can recommend the one or more standardized image characters.

For example, with regard to FIG. 3C, the character management system receives user input of the search query 340 and conducts a search for additional terms related to the search query 340. In particular, the character management system searches standardized image characters, words, combinations of standardized image characters and words, and other characters to identify a correspondence with the search query 340. With regard to words, the standardized image character identifies a correspondence between the search query 340 (i.e., "hate") and the recommend search term 342d (i.e., "hatersgonnahate").

With regard to standardized image characters, the character management system identifies a correspondence between the search query 340 (i.e., "hate") and the recommended search term 342b (i.e., an angry devil emoji 344). In particular, the character management system determines the contextual meaning of the angry devil emoji 344, compares the contextual meaning of the angry devil emoji 344 and the search query 340, and finds a correspondence (e.g., the angry devil emoji 344 has a contextual meaning including or relating to "hate" which corresponds to the search query 340).

Similarly, the character management system identifies a correspondence between the search query 340 and the recommended search term 342c. The recommended search term 342c comprises a combination of a standardized image character and another word (i.e., the word "hate" combined with the angry devil emoji 344). The character management system identifies a contextual meaning of the combined standardized image character/word (i.e., the contextual meaning of the word "hate" combined with the angry devil emoji 344) and identifies a correspondence between the contextual meaning and the search query 340. Accordingly, the character management system identifies the combined standardized image character/word as the recommended search term 342c.

In one or more embodiments, rather than identify a contextual meaning of a combined standardized image character and word, the character management system identifies a contextual meaning of the standardized image character in isolation (i.e., identifies the contextual meaning of the angry devil emoji 344 separately from the word "hate"). For instance, the character management system can determine that the angry devil emoji 144 has a contextual meaning that corresponds to the word "hate." Moreover, the character management system can identify a correspondence by comparing the contextual meaning of the standardized image character (e.g., the contextual meaning of the angry devil emoji 144) to the search query 340 and also comparing the word (i.e., "hate") to the search query 340.

Figure 4B:
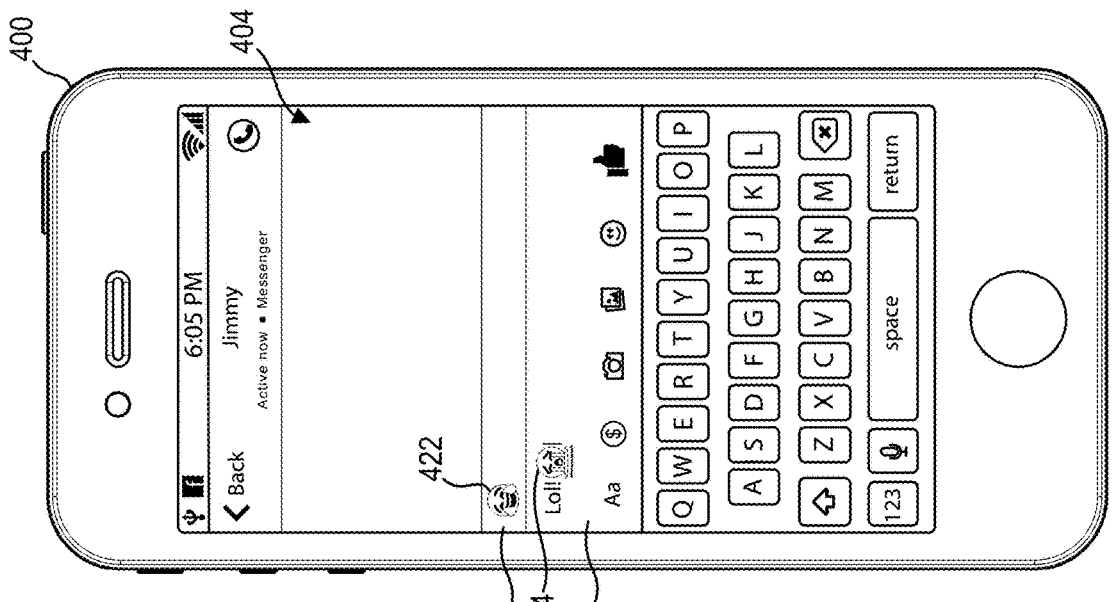
FIG. 4B illustrates a representation of the user interface of FIG. 4A including suggestions for a corrected standardized image character in accordance with one or more embodiments.

In addition to searching with regard to standardized image characters, the character management system can also facilitate communication with regard to standardized image characters. In particular, the character management system can identify, recommend, or correct electronic communications based on contextual meaning of one or more standardized image characters. For example, FIGS. 4A-4B illustrate facilitating electronic communication utilizing standardized image characters according to one or more embodiments.

Figure 4A:
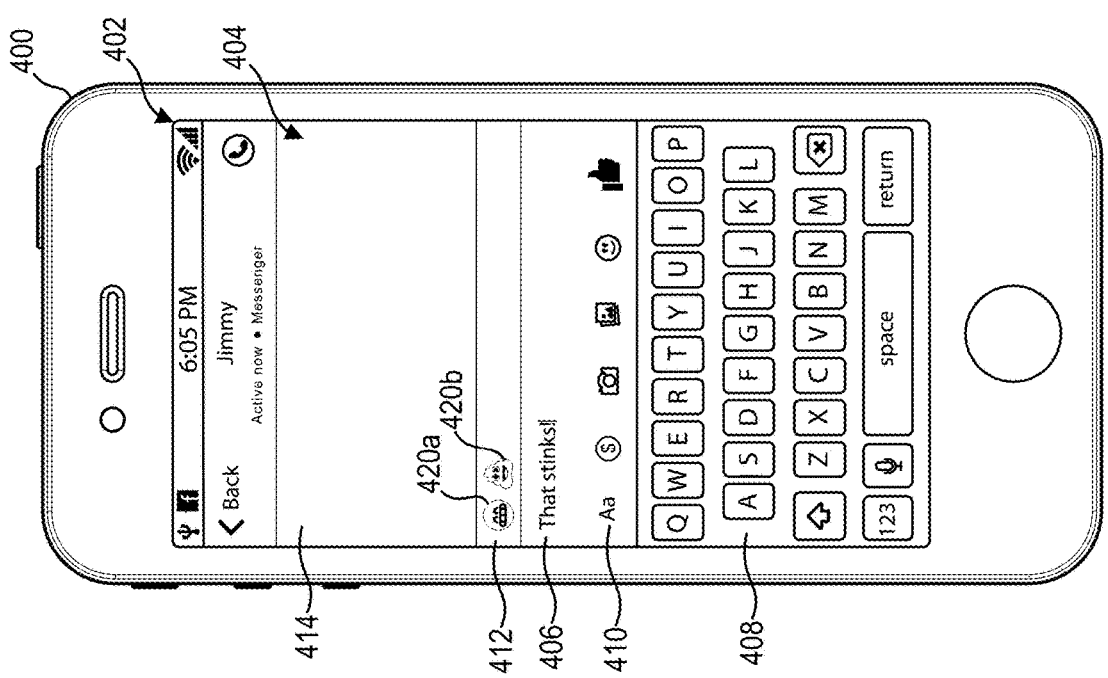
FIG. 4A illustrates a representation of a computing device displaying a communication user interface including suggestions including standardized image characters in a communication in accordance with one or more embodiments.

In particular, FIG. 4A illustrates a computing device 400 with a display screen 402 displaying a communication user interface 404. The communication user interface 404 facilitates the display of electronic communications sent by a user of the computing device 400 and/or received from one or more users. The communication user interface 404 is configured to provide a variety of components, elements, or icons. For example, as shown in FIG. 4A, the communication user interface 404 includes an input bar 406 (capable of presenting electronic messages and enabling editing of electronic messages prior to sending), a character input element 408 (capable of selecting, adding, removing, or altering characters with regard to the input bar 406), an additional communication options element 410 (e.g., add photos or transmit funds), and a recommendation bar 412 (capable of providing recommended characters, symbols, or text for utilization in an electronic message). The communication user interface 404 also includes a communication viewing field 414 that can display a communication thread between the user of the computing device 400 and another user (i.e., user "Jimmy" identified in the communication user interface 404 of FIG. 4A).

As mentioned, the character management system can recommend one or more standardized image characters to facilitate electronic communications. In particular, the character management system can recommend one or more standardized image characters based on contextual meaning to facilitate electronic communication. For instance, FIG. 4A illustrates the character management system providing for display (via the recommendation bar 412) a first recommended standardized image character 420a and a second recommended standardized image character 420b.

The character management system recommends the recommended standardized image characters 420a, 420b based on the characters entered in the input bar 406 and the contextual meaning of the recommended standardized image characters 420a, 420b. Specifically, the character management system detects user input of characters in the input bar 406. Moreover, the character management system conducts a search for similar characters (e.g., words or standardized image characters), based on the entered characters.

With regard to the illustrated example of FIG. 4A, the character management system conducts a search for "stinks" (and/or "that stinks") and compares the search query with contextual meaning of a plurality of standardized image characters. The character management system identifies a match between the search query and the contextual meaning of the recommended standardized image characters 420a, 420b. In particular, the character management system determines that both the first recommended standardized image character 420a and the second recommended standardized image character are commonly utilized in the context of "stinks" (or "that stinks"). Based on the identified match, the character management system provides the recommended standardized image characters 420a, 420b for display via the recommendation bar 412. Upon user interaction with the recommended standardized image characters 420a, 420b, the character management system adds one or more of the standardized image characters to the input bar 406.

Although FIG. 4A illustrates the recommended standardized image characters 420a, 420b provided in response to text entered via the input bar 406, the character management system can also provide recommendations (i.e., recommended text or recommended standardized image characters) in response to user input of a standardized image character. In particular, the character management system can provide recommendations based on a contextual meaning of a standardized image character provided by a user.

For example, the character management system can detect user input of a standardized image character (e.g., a standardized image character entered via the input bar 406). Moreover, the character management system can determine a contextual meaning of the detected standardized image character. Based on the contextual meaning, the character management system can conduct a search for other characters (e.g., words or standardized image characters). The character management system can identify a correspondence between the contextual meaning and words or standardized image characters and provide the words or standardized image character for display as recommended additions (e.g., via the recommendation bar 412) for the communication.

For instance, upon user entry of a heart standardized image character (e.g., the heart standardized image character 314), the character management system can determine a contextual meaning of the heart standardized image character (e.g., "love" or "I love you"). The character management system can identify words corresponding to the contextual meaning and provide the words for display (e.g., provide the word "love" or "I love you" via the recommendation bar 412).

Similarly, the character management system can identify a correspondence with the contextual meaning of other standardized image characters. For instance, the character management system can determine that a heart eyes standardized image character (e.g., the heart eyes standardized image character 322) has a similar contextual meaning (e.g., "love") as the heart standardized image character 314. Based on the identified similarity, the character management system can provide the heart eyes standardized image character 322 for display via the recommendation bar 412.

As mentioned previously, the character management system can also utilize contextual meaning to correct usage of one or more standardized image characters. For example, the character management system can identify a usage of a standardized image character, compare the usage to a determined contextual meaning, determine that the usage conflicts with the determined contextual meaning, and correct the usage.

For example, FIG. 4B illustrates the computing device 400 displaying the communication user interface 404. The user has provided (i.e., via user interaction with the character input element 408 and the input bar 406) a combination of text (i.e., "Lol!") and a crying standardized image character 424. The character management system can identify a contextual meaning of the crying standardized image character 424 and compare the contextual meaning with the entered text (i.e., compare the crying standardized image character with "Lol!"). Based on the comparison, the character management system can determine that the crying standardized image character 424 has a contextual meaning (e.g., "ughh," "sorry," "sad") that contradicts the entered text (e.g., "Lol!").

Moreover, the character management system can search for and identify a standardized image character that corresponds to the entered text. In particular, with regard to FIG. 4B, the character management system searches for a standardized image character with a contextual meaning corresponding to "Lol!" and identifies the laughing, crying standardized image character 422. Based on the determined contradiction (or conflict) between the crying standardized image character 424 and the entered text, and based on the correspondence between the entered text and the laughing, crying standardized image character 422, the character management system can provide an indication that the crying standardized image character 424 has been improperly used (e.g., underline the crying standardized image character 424) and also provide the laughing, crying standardized image character 422 within the recommendation bar 412. Moreover, based on user interaction with the laughing, crying standardized image character 422 within the recommendation bar 412, the character management system can replace the crying standardized image character 424 with the laughing, crying standardized mage character 422.

In addition, in one or more embodiments, the character management system can automatically correct (i.e., correct without additional selection, or user input, of a replacement) improper usage of a standardized image character. For example, in one or more embodiments, upon detecting an incongruity between the crying standardized image character 424 and entered text, the character management system can replace the crying standardized image character 424 with the laughing, crying standardized image character 422 (even without user selection of the laughing, crying standardized image character 422 via the recommendation bar 412).

Moreover, although FIG. 4B illustrates the character management system providing an indication of a misused standardized image character (e.g., underlining) together with a recommendation for a replacement, it will be appreciated that the character management system can provided an indication of a misused standardized image character without providing a recommended replacement. For instance, in one or more embodiments, the character management system can simply provide an indication of a misused standardized image character (e.g., underling) to notify the user that the contextual meaning of the standardized image character may conflict with the chosen usage.

In addition to facilitating electronic communication with standardized image characters, the character management system can also facilitate understanding and analysis with regard to use of standardized image characters. Indeed, individuals and businesses commonly seek to identify user sentiment or reaction with regard to products, advertisements, brands, figures, public personalities, celebrities or other public offering. The use of standardized image characters can provide an impediment to accurately determining consumer sentiment, given that the meaning and usage of standardized image characters is not well known and can vary over time. In one or more embodiments, the character management system can assist in determining a sentiment associated with a standardized image character based on contextual meaning.

Figure 5B:
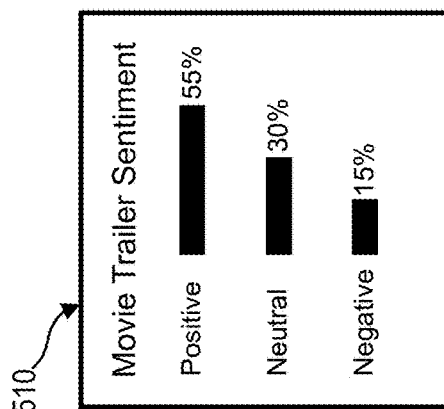
FIG. 5B illustrates a representation of a sentiment summary with regard to comments in accordance with one or more embodiments.
Figure 5A:
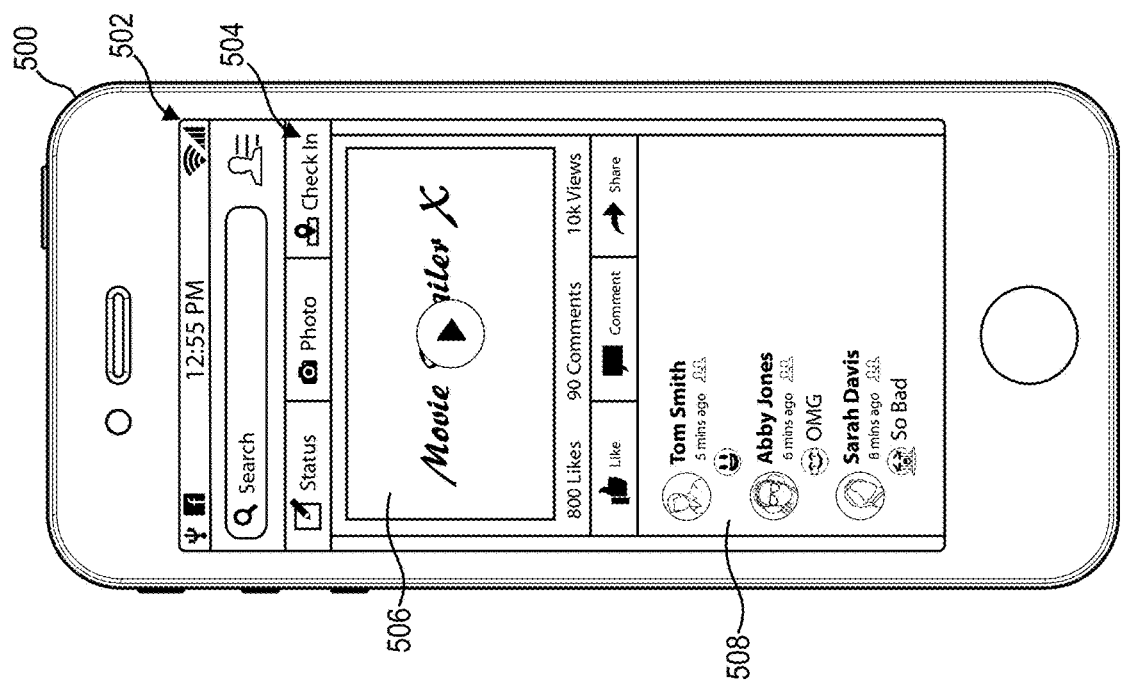
FIG. 5A illustrates a representation of a user interface for receiving comments with regard to a digital content item in accordance with one or more embodiments.

For example, FIG. 5A illustrates a computing device 500 with a display screen 502 displaying a social media user interface 504 configured to display a social media application. In particular, the social media user interface 504 includes a digital video element 506 for playing a digital video; specifically, a digital video corresponding to a trailer for a movie. Moreover, the social media user interface 504 provides options for users to provide comments for display to other users. In particular, the social media user interface 504 includes a comment field 508 containing comments provided by users with regard to the digital video.

As illustrated, many of the comments in the comment field 508 contain standardized image characters. The character management system can utilize contextual meaning of the standardized image characters to identify a sentiment. In particular, the character management system can identify user sentiment with regard to comments containing standardized image characters.

For example, the character management system can compile a plurality of electronic documents reflecting user sentiment (e.g., comments provided with regard to a movie trailer via the comment field 508). The character management system can identify standardized image characters corresponding to the plurality of electronic documents. Moreover, the character management system can determine contextual meaning of the identified standardized image characters. Accordingly, the character management system can utilize the contextual meaning to determine a user sentiment corresponding to each standardized image character.

In one or more embodiments, the character management system utilizes a variety of sentiment analysis approaches in conjunction with contextual meaning to identify sentiment. For example, in one or more embodiments, the character management system utilizes contextual meaning in conjunction with keyword spotting algorithms, lexical affinity algorithms, statistical algorithms, and/or concept-level algorithms to determine user sentiment. For instance, with regard to keyword spotting algorithms, the character management system can provide contextual meaning of standardized image characters (i.e., terms associated with a standardized image character from a semantic map) to a keyword spotting algorithm, which can identify sentiment based on the provided terms.

Accordingly, in one or more embodiments, the character management system can produce a summary of sentiment with regard to use of standardized image characters. For example, as illustrated in FIG. 5B, the character management system analyzes the contents of the comment field 508 and determines a sentiment summary 510. In particular, the sentiment summary 510 categorizes the comments into "Positive," "Neutral," or "Negative."

Although FIG. 5B illustrates a particular sentiment summary with particular sentiment categories, it will be appreciated that the character management system can produce sentiment summaries in a variety of forms. For instance, the sentiment summary 510 can have additional or fewer categories. For example, the sentiment summary 510 can analyze sentiment with regard to humor (e.g., how funny consumers found the movie trailer), excitement (e.g., how suspenseful), anxiety or fear (e.g., how frightening was the movie trailer), or some other emotion or characteristic. Similarly, the sentiment summary 510 can provide more detailed analysis. For example, the sentiment summary 510 can provide sentiment scores particular to individual demographic categories (e.g., age, user device, sex, ethnicity, etc.).

Although FIG. 5A illustrates the computing device 500 operating a particular social media application, it will be appreciated that the character management system can determine sentiment corresponding to standardized image characters in a variety of circumstances. For instance, the character management system can identify user sentiment with regard to feedback provided on a web page (e.g., comments provided on a webpage for the movie or a website for rating movies). Similarly, the character management system can identify user sentiment with regard to social media tags, social media posts, texts, e-mails, APIs, survey comments, or any other electronic document.

Figure 6:
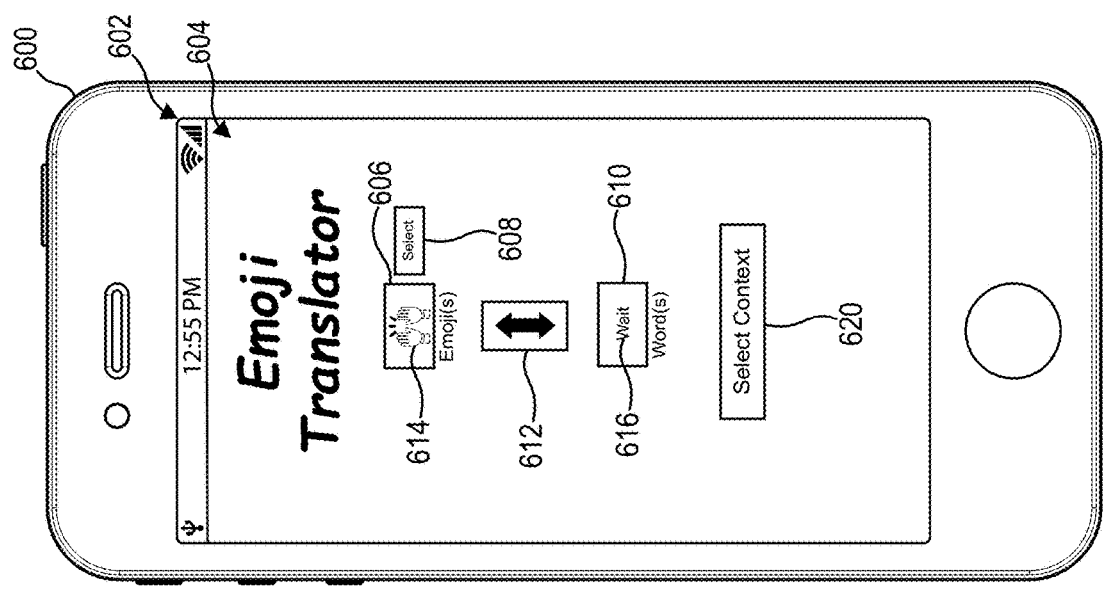
FIG. 6 illustrates a representation of a user interface for translating with regard to standardized image characters in accordance with one or more embodiments.

The character management system can also assist users in understanding the usage or meaning of standardized image characters. In particular, the character management system can utilize contextual meaning to provide usage or meaning information. For example, FIG. 6 illustrates a computing device 600 with a display screen 602 displaying a translator user interface 604. The translator user interface 604 contains elements to assist users in understanding a meaning or usage of standardized image characters. In particular, the translator user interface 604 includes an emoji input and output field 606 (capable of receiving, displaying, and providing emoji), an emoji selection element 608 (capable of providing a plurality of standardized image characters for selection by a user), a text input and output field 610 (capable of receiving, displaying, and providing a variety of characters, including words in a variety of languages), and a translate element 612 (operable to initiate a translating operation).

As illustrated, the character management system can translate standardized image characters into one or more words. For example, with regard to FIG. 6, the user can provide hand signal standardized image character 614 via the emoji input and output field 606. Upon user interaction with the translate element 612, the character management system can provide a word 616 (or definition) via the word input and output field 610 corresponding to the hand signal standardized image character 614.

In particular, the character management system can determine the contextual meaning of the hand signal standardized image character 614. Based on the determined contextual meaning, the character management system can identify the word 616. For example, in one or more embodiments the character management system provides the word 616 by identifying the word that is closest to the hand signal standardized image character 614 with regard to a semantic map.

It will be appreciated that although FIG. 6 illustrates a single word in the word input and output field, the character management system can provide a plurality of words (or other characters) that correspond to a selected standardized image character. For instance, in one or more embodiments, the character management system can generate a string of words comprising a definition based on contextual meaning of the standardized image character..

Moreover, it will be appreciated that although FIG. 6 illustrates a single standardized image character in the emoji input and output field 606, the character management system can provide a translation with regard to a plurality of standardized image characters or a combination of standardized image characters and text. For example, a user can enter multiple standardized image characters, and the character management system can provide a contextual meaning to the multiple standardized image characters as entered. Similarly, a user can enter a standardized image character with text (e.g., lmao☺), and the character management system can provide one or more words representing a contextual meaning of the combined standardized image character and text.

The character management system can also translate one or more words into one or more standardized image characters. For instance, with regard to FIG. 6, a user can enter the word 616 (i.e., "wait") into the text input and output field 610, and, upon user interaction with the translate element 612, the character management system can provide the hand signal standardized image character 614 via the emoji input and output field 606. In particular, the character management searches for a contextual meaning with regard to a standardized image character that corresponds to the word 616. With regard to FIG. 6, the character management system identifies the hand signal standardized image character 614 based on the word 616.

As illustrated, the translate user interface 604 also includes a select context element 620. The select context element 620 enables a user to identify context that may impact the contextual meaning of a standardized image character. For example, the contextual meaning of a standardized image character may change based on a variety of factors, including, time, language, population, location, age group, sex, ethnicity, or other factors. Accordingly, upon user interaction with the select context element 620, a user can provide information indicative of a particular time, language, population, location, age group, sex, or ethnicity. Moreover, a user can provide information indicative of document type (e.g., word processing or social media tag), device type (e.g., mobile device or laptop), application type, operating system (e.g., iOS versus Android) or other characteristic particular to the desired translation. For example, a user may wish to know the contextual meaning of an emoji, as utilized in Japan in 2010. Similarly, a user may wish to know the contextual meaning of an emoji as currently utilized by teenagers (versus elderly users). The select context element 620 enables a user to provide such information for utilization by the character management system.

The character management system can determine and provide a particularized contextual meaning specific to a variety of factors or characteristics. For example, the character management system can provide contextual meaning particular to demographic information (e.g., location, culture, language, gender, sex, ethnicity, age). Similarly, the character management system can provide contextual meaning particular to a device associated with one or more users (e.g., mobile device, laptop, tablet, device brand, etc.), an application utilized by one or more users (e.g., a particular social media application utilized by a user, a particular internet browser application utilized by a user), or an operating system utilized by one or more users. Furthermore, the character management system can provide contextual meaning particular to a period of time or particular to characteristics of electronic documents (e.g., web pages, texts, social media posts, size), etc.

In one or more embodiments, the character management system can identify contextual meaning specific to particular factors or characteristics by controlling electronic documents within a document repository. In particular, as described in detail above, the character management system can generate a document repository or identify a portion of a document repository specific to a variety of factors or characteristics and generate a contextual meaning specific to the generated document repository. Thus, for example, the character management system can determine a particularized contextual meaning with regard to a particular region by generating a repository of electronic documents originating from the particular region (e.g., social media posts from users located in Georgia) and then identifying a contextual meaning from the generated repository. Similarly, in one or more embodiments, the character management system determines a particularized contextual meaning with regard to a specific device by generating a repository of electronic documents created by the particular device and identifying a contextual meaning from the generated repository.

Although FIG. 6 illustrates the select context element 620, it will be appreciated that the character management system can provide a particularized contextual meaning targeted to particular circumstances or factors without a specific element, user interaction, or user input. For instance, in one or more embodiments, the character management system detects a characteristic and automatically adjusts contextual meaning based on the detected characteristic. Specifically, in one or more embodiments, the character management system detects a language associated with a device and automatically utilizes a particularized contextual meaning specific to the detected language (e.g., detects that a user communicates in Japanese, and utilizes a contextual meaning corresponding to the Japanese language). Similarly, the character management system can detect any variety of other characteristics and automatically adjust the contextual meaning (e.g., automatically adjust the contextual meaning based on age, client device, region, operating system, device type, etc.).

Moreover, the character management system can also detect a change in time and update contextual meaning based on the change in time. For instance, with regard to FIG. 6, the character management system can provide a first contextual meaning corresponding to a standardized image character at a first point in time. At a second point in time, the character management system can provide a second contextual meaning corresponding to the standardized image character at the second point in time.

Indeed, as mentioned previously, the usage and meaning of standardized image characters can change over a period of days, weeks, months, or years. The character management system can dynamically update the contextual meaning associated with standardized image characters as the meaning and usage changes. In particular, the character management system can dynamically update a repository of electronic documents, such that the repository of electronic documents contains recent usage and meaning information corresponding to a particular standardized image character. In some embodiments, the character management system can weight the effects of standardized image character usage based on a variety of factors, such as recency, volume, etc. For example, the character management system can weight more recent usage of a standardized image character more heavily than less recent usage. By dynamically updating the repository of electronic documents, the character management system can also dynamically generate a contextual meaning corresponding to updated usage of standardized image characters.

For instance, in one or more embodiments, the character management system dynamically gathers social media posts, comments, and tags; creates a dynamic repository of the social media posts, comments, and tags that is limited by a particular time range (e.g., the preceding month); and dynamically generates a contextual meaning from the dynamic repository.

Although discussed predominantly in conjunction with FIG. 6, it will be appreciated that various features of the character management system with regard to particularized contextual meaning based on various characteristics or factors, updating contextual meaning over time, etc., also apply to other embodiments disclosed herein.

For example, with regard to embodiments described with regard to FIGS. 3A-3C, the character management system can provide particularized contextual meaning to specific characteristics or factors. In particular, with regard to searches described in conjunction with FIGS. 3A-3C, the character management system can adjust contextual meaning based on one or more detected characteristics or factors.

For example, the character management system can detect one or more characteristics associated with the computing device 300 and/or its user (e.g., age, ethnicity, location, language, operating system, etc.) and adjust the contextual meaning of one or more standardized image characters in conducting searches or providing recommendations with regard to standardized image characters. For instance, the character management system can determine that the computing device 300 is located in China and adjust the contextual meaning of standardized image characters based on the determined location in conducting searches or providing recommendations.

Similarly, the character management system with regard to embodiments of FIGS. 3A-3C can dynamically update contextual meaning. In particular, the character management system can dynamically update contextual meaning with regard to standardized image characters such that the search and recommendation capabilities described with regard to FIGS. 3A-3C reflect the most recent usage of one or more standardized image characters over time. For example, the character management system can modify search results with regard to the heart standardized image character 314 as the usage of the heart standardized image character 314 changes over time.

Likewise, with regard to embodiments described above with regard to FIGS. 4A-4B, the character management system can also identify particularized contextual meaning specific to particular characteristics. For instance, the character management system can suggest or correct standardized image characters based on characteristics of the computing device 400 or a user associated with the computing device 400.

For example, the character management system can determine a location of the computing device 400 and generate a particularized contextual meaning corresponding to the specific location. Moreover, the character management system can generate recommended standardized image characters (e.g., the recommended standardized image characters 420*a*, 420*b*) based on the location of the user (e.g., if usage differs with regard to the location of the user compared other locations, the character management system can recommend different standardized image characters).

Similarly, the character management system can also modify contextual meaning based on one or more characteristics associated with a recipient of an electronic communication. For instance, the character management system can determine a variety of characteristics or features with regard to a recipient (i.e., "Jimmy" identified in FIG. 4A) of an electronic communication. Specifically, with regard to FIG. 4A, the character management system can determine that recipient Jimmy has a variety of different characteristics than the user of the computing device 400 (e.g., Jimmy is located in a different location, utilizing a different device, running a different operating system, etc.). Moreover, the character management system can identify a particularized contextual meaning of standardized image characters (and adjust recommendations or corrections with regard to standardized image characters) based on the detected characteristics associated with the recipient, Jimmy.

Furthermore, the character management system can also dynamically update contextual meaning with regard to standardized image characters utilized to facilitate communication. Thus, for example, the character management system can recommend different standardized image characters over time as the usage of the standardized image characters changes over time.

In addition, the character management system can generate particularized contextual meanings for standardized image characters with regard to embodiments of FIGS. 5A-5B with regard to facilitating identification of user sentiment. For example, the character management system can vary contextual meaning of standardized images with regard to particular characteristics or features of users providing comments within the comment field 508. For instance, with regard to the embodiment of FIG. 5A, the character management system can identify a location of "Tom Smith," an individual who provided a comment within the comment field 508, generate a particularized contextual meaning based on the location, and determine a sentiment from the particularized contextual meaning.

By utilizing contextual meaning specific to the characteristics of individual users, the character management system can identify different intended sentiment among users, even though the users may utilize the same standardized image character. For example, in one or more embodiments, the character management system can determine a first contextual meaning of a standardized image character with regard to a comment provided by a user from a first location (i.e. the United States). The character management system can determine a second contextual meaning of the same standardized image character with regard to a comment provided by a second user from a second location (i.e., Canada). The character management system can thus determine two different sentiment scores based on the first and second contextual meanings, despite the fact that the first and second users provided the same standardized image character. Accordingly, the character management system can provide a much more nuanced and accurate sentiment analysis by utilizing particularized contextual meaning based on the specific characteristics or features of a user.

Furthermore, by dynamically updating contextual meaning, the character management system can provide a more accurate sentiment analysis over time. Indeed, the character management system can detect and incorporate modifications in contextual meaning over time in generating the sentiment summary 510.

Aside from identifying contextual meaning of a standardized image character based on characteristics of a user or device, the character management system can also determine one or more characteristics of a user based on utilization of a standardized image character. For instance, the character management system can determine that utilization of a certain standardized image character (or utilization of a certain standardized character in a certain manner) corresponds to a particular characteristic or population. Accordingly, upon detecting that a user utilizes a standardized image character (or utilizes a standardized image character in a particular manner), the character management system can infer that a user has a particular characteristic or belongs to a particular population.

For example, the character management system can determine that utilization of a first standardized image character is popular among users of a particular age group. The character management system can determine that a user utilizes the first standardized image character and infer that the user belongs to the particular age group.

Similarly, the character management system can determine that individuals that utilize a particular application (e.g., iMessenger) utilize a second standardized image character in a particular manner. The character management system can detect that a user utilizes the second standardized image character in the particular manner and infer that the user utilizes the particular application.

Figure 7:
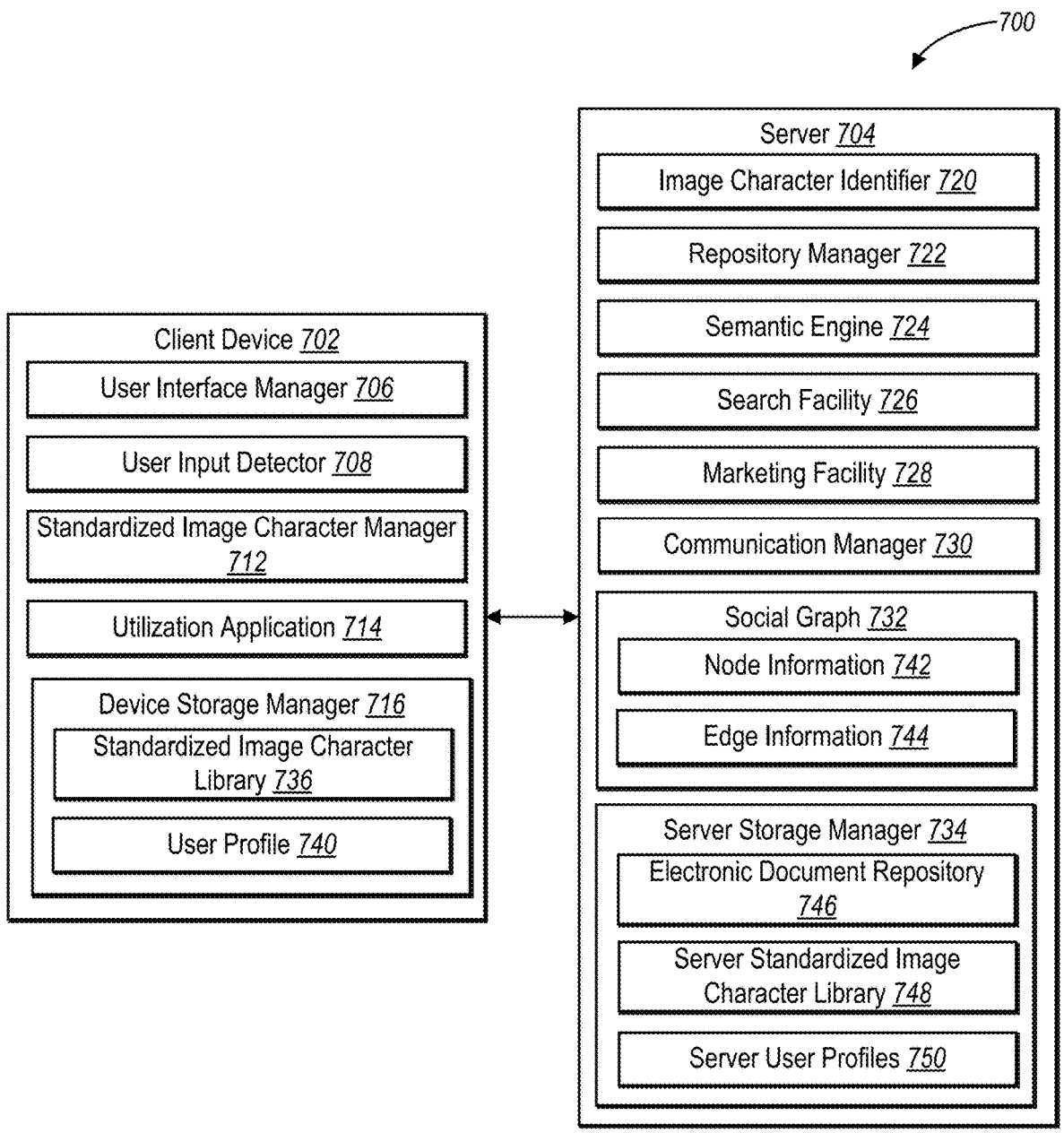
FIG. 7 illustrates a schematic diagram of an electronic communication system in accordance with one or more embodiments.

Turning now to FIG. 7, additional detail will be provided regarding various components and capabilities of the character management system in accordance with one or more embodiments. In particular, FIG. 7 illustrates an example embodiment of a character management system 700 (i.e., the "character management system" described above) in accordance with one or more embodiments.

As shown, the character management system 700 may include, but is not limited to, a client device 702 and a server 704. Moreover, as shown, the client device 702 includes, but is not limited to, a user interface manager 706; a user input detector 708; a standardized image character manager 712; a utilization application 714; and a device storage manager 716. In addition, the device storage manager 716 includes standardized image character library 736 and user profile 740.

Furthermore, as shown in FIG. 7, the server 704 includes, but is not limited to, an image character identifier 720, a repository manager 722, a semantic engine 724, a search facility 726, a marketing facility 728, a communication manager 730, a social graph 732 (including node information 742 and edge information 744), and a server storage manager 734 (including electronic document repository 746, server standardized image character library 748, and server user profiles 750).

As just mentioned, and as illustrated in FIG. 7, the client device 702 includes the user interface manager 706. The user interface manager 706 can provide, manage, and/or control a graphical user interface (or simply "user interface") for use with the character management system 700. In particular, the user interface manager 706 may facilitate presentation of information by way of an external component of the client device 702. For example, the user interface manager 706 may display a user interface by way of a display screen associated with the client device 702. The user interface may be composed of a plurality of graphical components, objects, and/or elements that allow a user to perform a function. The user interface manager 706 can present, via the client device 702, a variety of types of information, including text, images, video, audio, characters, or other information. Moreover, the user interface manager 706 can provide a variety of user interfaces specific to any variety of functions, programs, applications, plug-ins, devices, operating systems, and/or components of the client device 702 (e.g., the user interfaces 304, 404, 504, and 604).

The user interface manager 706 can provide a user interface with regard to a variety of operations or applications (e.g., the utilization application 714). For example, the user interface manager 706 can provide a user interface that facilitates composing, sending, or receiving an electronic communication containing a standardized image character. Similarly, the user interface manager 706 can generate a user interface that facilitates searching a plurality of electronic documents, such as web pages, social media posts, tags, or other electronic documents. Moreover, the user interface manager 706 can provide a user interface that facilitates using or understanding (i.e., translating) one or more standardized image characters. Additional details with respect to various example user interface elements are described throughout with regard to various embodiments containing user interfaces.

In addition to the user interface manager 706, as shown in FIG. 7, the client device 702 also includes the user input detector 708. The user input detector 708 can detect, identify, monitor, receive, process, capture, and/or record various types of user input. For example, the user input detector 708 may be configured to detect one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 708 can operate in conjunction with any number of user input devices or computing devices (in isolation or in combination), including personal computers, laptops, smartphones, smart watches, tablets, touchscreen devices, televisions, personal digital assistants, mouse devices, keyboards, track pads, or stylus devices. The user input detector 708 can detect and identify various types of user interactions with user input devices, such as select events, drag events, scroll events, and so forth. For example, in the event the client device 702 includes a touch screen, the user input detector 708 can detect one or more touch gestures (e.g., swipe gestures, tap gestures, pinch gestures, or reverse pinch gestures) from a user that forms a user interaction.

Furthermore, the user input detector 708 can detect or identify user input in any form. For example, the user input detector 708 can detect a user interaction with respect to a variety of user interface elements, such as selection of a graphical button, a drag event within a graphical object, or a particular touch gesture directed to one or more graphical objects or graphical elements of a user interface. Similarly, the user input detector 708 can detect user input directly from one or more user input devices.

The user input detector 708 can communicate with, and thus detect user input with respect to, a variety of programs, applications, plug-ins, operating systems, user interfaces, or other implementations in software or hardware. For example, the user input detector 708 can recognize user input provided in conjunction with the utilization application 714 indicating a desire to search for a standardized image character, select a recommended standardized image character, obtain information regarding a standardized image character, and so forth.

In addition, as illustrated in FIG. 7, the client device 702 also includes the standardized image character manager 712. The standardized image character manager 712 can manage, search, identify, and/or analyze one or more standardized image characters. In particular, the standardized image character manager 712 can manage, search, compare, identify, or analyze one or more standardized image characters on the client device 702 (e.g., for the utilization application 714 on the client device 702).

For instance, the standardized image character manager 712 can identify a standardized image character on the client device 702 that corresponds to another term or character (or plurality of terms or characters). For example, the standardized image character manager 712 can compare a word or character to one or more standardized image characters. More specifically, the standardized image character manager 712 can compare a word or character to a contextual meaning associated with one or more standardized image characters. For instance, the standardized image character manager 712 can access a contextual meaning of one or more standardized characters and compare the contextual meaning with regard to another term.

The standardized image character manager 712 can identify a contextual meaning of a standardized image character via the device storage manager 716. In particular, the standardized image character manager 712 can identify a contextual meaning via the standardized image character library 736. As discussed further below, the standardized image character library 736 may be stored at the client device 702 (as illustrated), or may be stored at the server 704 and provided by the server 704 to the client device 702.

For example, as discussed above, the user input detector 708 can detect user input of a term or character. The standardized image character manager 712 can compare the term or character to a contextual meaning of standardized image character (i.e., via the standardized image character library 736). Specifically, the standardized image character manager 712 can identify a match or correspondence between a contextual meaning of a standardized image character and another term or character. Similarly, the standardized image character manager 712 can identify a dissimilarity between a contextual meaning of a standardized image character and another term or character.

In this manner, the standardized image character manager 712 can search or identify standardized image characters on the client device 702 with regard to other terms or characters. For example, the standardized image character manager 712 can identify a standardized image character on the client device 702 based on a particular term or character. Similarly, the standardized image character manager 712 can identify a term or character on the client device 702 based on a standardized image character on the client device 702.

Furthermore, the standardized image character manager 712 can identify an incongruity between a standardized image character on the client device 702 and another term or character. For example, the standardized image character manager 712 can identify a particular use of a standardized image character on the client device 702 with another term or character that is incongruous with the contextual meaning of the standardized image character. Moreover, the standardized image character manager 712 can identify a standardized image character that better corresponds to the term or character.

Additionally or alternatively, the standardized image character manager 712 can also conduct a search or identify a contextual meaning of a standardized image character via the server 704. For instance, a user may provide a search query directed to a plurality of target electronic documents stored (or accessed) via the server 704 (e.g., a search query directed to target electronic documents stored in the electronic document repository 746). The standardized image character manager 712 can contact the server 704 (e.g., via the communication manager 730) and request a search (e.g., via the search facility 726) with regard to the target electronic documents. The standardized image character manager 712 can receive the results of the search from the search facility 726 (e.g., via the communication manager 730).

Similarly, the standardized image character manager 712 can receive a search query that contains a standardized image character that is not included in the standardized image character library 736. The standardized image character manager 712 can request and receive a contextual meaning from the server 704 (e.g., from the semantic engine 724 or the server standardized image character library 748).

Moreover, as shown in FIG. 7, the client device 702 also includes the utilization application 714. The utilization application 714 includes one or more applications that utilize standardized image characters. In particular, the utilization application 714 includes one or more applications that communicate, convey, and/or utilize standardized image characters.

The utilization application 714 can include a variety of applications that utilize standardized image characters. For instance, the utilization application 714 can include a web browser, a communication application (e.g., instant messaging, e-mail, or chat), a social media application, a translation application, a marketing application, a word processing application, a spreadsheet application, an image application (e.g., image viewing or image editing), or another application.

The utilization application 714 can communicate with and interact with other components of the character management system 700. For instance, the utilization application 714 can communicate with the standardized image character manager 712 to identify standardized image characters on the client device 702 (e.g., via the standardized image character library 736). Similarly the utilization application 714 can interact with the standardized image character manager 712 to conduct searches with regard to standardized image characters (as just described). In one or more embodiments, the utilization application 714 can also directly contact the server 704, the search facility 726, the server storage manager 734, the marketing facility 728, the social graph 732, or other components.

For example, in one or more embodiments, the utilization application 714 comprises a communication application (e.g., an instant messaging application). The communication application can receive (e.g., via the user input detector 708) a particular term to be included in an electronic communication to a recipient. The utilization application 714 can utilize the standardized image character manager 712 to identify a standardized image character on the client device 702 with a contextual meaning that corresponds to the particular term. Moreover, the utilization application 714 can recommend the identified standardized image character.

Similarly, in one or more embodiments the utilization application 714 includes a web browser that permits a user to access and search web pages. In such circumstances, the utilization application 714 can receive user input (e.g., via the user input detector 708) of a standardized image character as part of a search query. The utilization application 714 can communicate with the standardized image character manager 712, which contacts the search facility 726 to perform a search of a repository of electronic documents with regard to the standardized image character and the search query.

As illustrated in FIG. 7, the client device 702 also includes the device storage manager 716. The device storage manager 716 maintains data on the client device 702 for the character management system 700. The device storage manager 716 can maintain data of any type, size, or kind, as necessary to perform the functions of the character management system 700.

As shown in FIG. 7, the device storage manager 716 includes standardized image character library 736. The standardized image character library 736 includes data regarding one or more standardized image characters. In particular, the standardized image character library 736 includes data regarding the coding, appearance, and/or meaning of standardized image characters.

For example, the standardized image character library 736 can include one or more data files identifying all available standardized image characters. For instance, the standardized image character library 736 can include one or more data files that identify emoji and the Unicode characters that describe or define the emoji. Similarly, the standardized image character library 736 can include one or more data files that identify images corresponding to emoji Unicode characters.

In addition, the standardized image character library 736 can include one or more data files identifying contextual meaning. For example, the standardized image character library 736 can periodically receive from the server 704 one or more data files identifying contextual meaning with regard to one or more standardized image characters. In particular the standardized image library 736 can include one or more data files in the form of a database that includes entries that tie standardized images characters to one or more meanings, definitions, terms, or characters. Similarly, the standardized image library can include a data file defining a semantic map with regard to a plurality of standardized image characters and/or other terms and characters.

Moreover, FIG. 7 also shows that the device storage manager 716 includes user profile 740. User profile 740 includes one or more characteristics regarding one or more users. In particular, user profile 740 can include characteristics regarding one or more users of the client device 702. The character management system 700 can utilize any information stored in user profile 740 to select, identify, recommend, search, or utilize standardized image characters.

For example, user profile 740 can include information regarding age, location, language, ethnicity, or other demographic information. Similarly, user profile 740 can include information regarding a client device associated with a user, such as device type, operating system, or applications.

User profile 740 can also include information regarding user preferences. For example, user profile 740 can include information regarding a user's preferences with regard to particular standardized image characters. Thus, for example, user profile 740 can include information indicating that a user prefers to use particular emoji.

Similarly, user profile 740 can also include information regarding prior user conduct. For example, user profile 740 can include information regarding a user's prior utilization of standardized image characters (or a user's prior utilization of text or other characters in conjunction with standardized image characters). Thus, user profile 740 can include information indicating that a user routinely utilizes heart emoji when utilizing the word "cute."

Furthermore, as shown in FIG. 7, the server 704 includes the image character identifier 720. The image character identifier 720 can gather, identify, index, and/or compile one or more image characters from one or more electronic documents. In particular, the image character identifier 720 can identify standardized image characters from a repository of electronic documents (e.g., the electronic document repository 746). Moreover, the image character identifier 720 can identify standardized image characters regardless of form, platform, code base, syntax, or other variations.

For example, as described above, the image character identifier 720 can identify all available standardized image characters across platforms and code bases. In particular, in in one or more embodiments the image character identifier 720 accesses a record of available standardized image characters and corresponding code points (e.g., a third-party record stored on a remote server or a record stored on the server storage manager 734). Moreover, the image character identifier 720 can retrieve standardized image characters and corresponding code points for utilization in the character management system.

In addition, the image character identifier 720 can recognize new standardized image characters as they develop. Indeed, in one or more embodiments, the image character identifier 720 identifies updates to a record of available standardized image characters. Accordingly the image character identifier can recognize and identify new standardized image characters as they become available.

As illustrated in FIG. 7, the server 704 also includes the repository manager 722. The repository manager 722 can identify, generate, create, build, manage, define, and/or provide access to one or more collections of electronic documents. In particular, the repository manager 722 can generate or access one or more collections of electronic documents that contain standardized image characters.

The repository manager 722 can manage different repositories of electronic documents for different purposes. For instance, the repository manager 722 can generate one or more repositories of electronic documents in order to generate a contextual meaning with regard to a standardized image character. In addition, the repository manager 722 can define another repository of electronic documents in order to conduct a search query (e.g., identify a plurality of target electronic documents to search). Similarly, the repository manager 722 can define another repository of electronic documents to conduct a search directed to a targeted subset of electronic documents.

The repository manager 722 can operate in conjunction with any collection of electronic documents. For instance, the repository manager 722 can generate a repository of electronic documents comprising a single file summarizing the contents of social media posts. The repository manager 722 can also define (or provide access to) a repository of all electronic documents available on the Internet. Moreover, the repository manager 722 can generate a repository from components or parts of other electronic documents. For instance, the repository manager 722 can generate an index of tags from social media posts or comments.

As discussed in greater detail above, the repository manager 722 can generate or define a repository of electronic documents based on a variety of characteristics or factors. For instance, the repository manager 722 can generate a repository of electronic documents based on demographic characteristics of one or more users, based on characteristics of a client device, based on time, based on characteristics of electronic documents, or other characteristics or factors.

In this manner, the repository manger 722 can define a repository of electronic documents that meets the particular needs or functions of the character management system 700. For instance, the repository manager 722 can define a repository so as to identify a particularized contextual meaning with regard to one or more standardized image characters and one or more populations (e.g., via the semantic engine 724). For example, the repository manager 722 can define a repository specific to a particular region to identify a particularized contextual meaning with regard to standardized image characters in the particular region. Similarly, the repository manager 722 can dynamically update the repository of electronic documents to provide dynamically updated contextual meaning with regard to one or more standardized image characters.

Furthermore, as illustrated in FIG. 7, the server 704 includes the semantic engine 724. The semantic engine 724 can determine, identify, and/or calculate meaning with regard to one or more characters, images, or terms. In particular, the semantic engine 724 can determine contextual meaning with regard to one or more standardized image characters.

For example, in one or more embodiments, the semantic engine 724 determines contextual meaning of a standardized image character based on a repository of electronic documents containing the standardized image character (e.g., a repository generated or defined by the repository manager 722). For instance, the semantic engine 724 can determine contextual meaning by analyzing how the standardized image character is used in the repository of electronic documents.

In one or more embodiments, the semantic engine 724 utilizes natural language processing to identify a contextual meaning from a repository of electronic documents. Specifically, in one or more embodiments, the semantic engine 724 utilizes a word to vector algorithm that calculates a vector representation with regard to contextual meaning for one or more standardized image characters contained in a repository of electronic documents. More specifically, in one or more embodiments, the semantic engine 724 utilizes a Gensim topic modeling algorithm to produce a semantic map. As described above, in one or more embodiments, the semantic engine 724 produces a semantic map comprising a 100-dimensional representation for words and emoji.

The semantic engine 724 can determine contextual meaning (e.g., generate a semantic map) with regard to a variety of semantic symbols. For instance, the semantic engine 724 can generate a semantic map that embeds words, symbols, digital images and standardized character images. In this manner, the semantic engine 724 can identify semantic relationships between standardized image characters and other words, symbols, digital images, etc.

Moreover, in one or more embodiments, the semantic engine 724 can further identify contextual meaning with regard to standardized image characters by utilizing vector representations corresponding to the standardized image characters. For instance, the semantic engine 724 can add, subtract, multiply, or divide vector representations corresponding to standardized image characters. Thus, for example the semantic engine 724 can identify a difference between vector representations corresponding to two standardized image characters to determine distinguishing characteristics between the two standardized images.

For example, in conducting a search, providing a recommendation, determining sentiment, or identifying a meaning of a particular standardized image character, the semantic engine 724 can apply algebraic operators to the standardized image characters to further identify contextual meaning. For instance, if a user seeks to identify an emoji that corresponds to a particular word, the character management system 700 may identify two similar emoji corresponding to the word. In one or more embodiments the semantic engine 724 can apply algebraic operators to the two similar emoji to determine which emoji most closely aligns to the particular word (e.g., subtract one vector representation from the other to determine if the remaining contextual meaning corresponds to the particular word).

In addition to the semantic engine 724, as shown in FIG. 7, the server 704 also includes the search facility 726. The search facility 726 can perform searches with regard to standardized image characters. In particular, the search facility 726 can compare contextual meaning of one or more standardized image characters with one or more additional terms or characters. For example, the search facility 726 can receive a search query and conduct a search with regard to standardized image characters within a repository of electronic documents (e.g., the electronic document repository 746).

Thus, the search facility 726 can conduct a search based on standardized image characters and identify other standardized image characters (or other terms, images or characters) responsive to the search from a repository of electronic documents. Similarly, the search facility 726 can conduct a search based on a word or image and identify standardized image characters and/or other terms or characters responsive to the search query from a repository of electronic documents.

For example, in one or more embodiments, the search facility 726 can receive a search query from the client device 702 (e.g. via the communication manager 730). The search facility 726 can identify a repository of electronic documents to search (e.g., based on user input from the user input detector 708 and the repository manager 722) and receive a plurality of standardized image characters contained within the repository of electronic documents (e.g., from the image character identifier 720). Moreover, the search facility 726 can identify contextual meaning (e.g., via the semantic engine 724) corresponding to each of the identified standardized image characters. In addition, the search facility 726 can compare the search query to the contextual meaning associated with each of the identified standardized image characters. Based on the comparison, the search facility can identify a correspondence (or a lack of correspondence) between the search query and the contextual meaning of each of the identified standardized image characters. In this manner, the search facility 726 can identify standardized image characters corresponding to a search query with regard to an electronic document repository.

The search facility 726 can operate in conjunction with a variety of search queries. For example, the search facility 726 can conduct searches based on a search query comprising a standardized image character. The search facility 726 can also conduct searches based on a search query comprising other characters (e.g., words), a combination of words and standardized image characters, digital images, or other semantic symbols.

For example, the search facility 726 can compare contextual meaning for a standardized image character with a word and identify a correspondence (or lack of correspondence) between the contextual meaning and the word. Similarly, the search facility 726 can compare contextual meaning for a standardized image character with another contextual meaning of another standardized image character and identify a correspondence (or lack of correspondence). In addition, the search facility 726 can compare a contextual meaning for a standardized image character with an image, a combination of text and standardized images, or any variety of other combinations of characters or images.

Furthermore, the search facility 726 can identify a variety of search results. For instance, the search facility 726 can identify electronic documents responsive to a search query that comprise standardized image characters, digital images, other characters (e.g., text), or a combination of standardized image characters and words.

As illustrated in FIG. 7, the server 704 also includes the marketing facility 728. The marketing facility 728 can utilize standardized image characters to receive, generate, and/or provide analysis with regard to marketing and standardized image characters. For instance, the marketing facility 728 can determine sentiment with regard to one or more consumers utilizing standardized image characters. The marketing facility 728 can also provide summaries, reports, analyses, and other information regarding standardized image characters utilized in marketing.

For example, the marketing facility 728 can receive a plurality of electronic documents (e.g., via the electronic document repository 746 and/or the repository manager 722) reflecting consumer communications regarding a product, brand, or company. The marketing facility 728 can receive (via the semantic engine 724) contextual meanings with regard to a plurality of standardized image characters contained within the plurality of electronic documents. Utilizing the contextual meaning, the marketing facility 728 can translate the standardized image characters into a consumer sentiment. For example, the marketing facility 728 can translate the standardized image characters to a positive sentiment or negative sentiment.

The marketing facility 728 can generate a variety of summaries, reports, and analyses regarding consumer sentiment. For instance, the marketing facility 728 can identify sentiment with regard to a variety of demographic information (e.g., age, ethnicity, gender) or other characteristics (e.g., device type, application utilized, operating system). The marketing facility 728 can also provide summaries, reports, and analyses to a corresponding merchant (e.g., via the client device 702).

As shown in FIG. 7, the server 704 also includes the communication manager 730. The communication manager 730 can facilitate receiving and sending data. In particular, the communication manager 730 can facilitate sending and receiving electronic communications. Specifically, the communication manager 730 can receive and send electronic communications between the client device 702 and another client device. For example, the communication manager 730 can package content to be included in an electronic communication and format the electronic communication in any necessary form that is able to be sent through one or more communication channels and using an appropriate communication protocol. Furthermore, the communication manager 730 can facilitate communication between the server 704 and the client device 702.

As further illustrated in FIG. 7, in the case of the character management 700 system comprising a social-networking system, the character management system 700 may include a social graph 732 for representing and analyzing a plurality of users and concepts. As shown in FIG. 7, the social graph 732 can include node information 742 that stores information comprising nodes for users, nodes for concepts, and/or nodes for items. In addition, the social graph 732 can include edge information 744 comprising relationships between nodes and/or actions occurring within the social-networking system. Further detail regarding social-networking systems, social graphs, edges, and nodes is presented below.

As shown in FIG. 7, the server 704 may also contain the server storage manager 734. The server storage manager 734 maintains data for the character management system 700 on the server 704. The server storage manager 734 can maintain data of any type, size, or kind, as necessary to perform the functions of the character management system 700.

As illustrated, the server storage manager 734 includes the electronic document repository 746. The electronic document repository 746 includes any collection of electronic documents. For instance, the electronic document repository 746 can comprise a collection of social media posts, a collection of tags corresponding to social media posts or comments, or a collection of any other type of document. In one or more embodiments, the electronic document repository 746 can comprise electronic documents available via the Internet (e.g., documents accessible via the world wide web). Moreover, the electronic document repository 746 can include any collection of documents described above with regard to the repository manager 722.

As shown in FIG. 7, the server storage manager 734 also includes the server standardized image character library 748. The server standardized image character library 748 includes data regarding one or more standardized image characters. In particular, the server standardized image character library 748 includes data regarding the coding, appearance, or meaning of standardized image characters.

In one or more embodiments, the server 704 can transfer data from the server standardized image character library 748 to the client device 702 (e.g., the standardized image character library 736). For instance, in one or more embodiments, the server 704 can dynamically update the server standardized image character library 748 (e.g., to reflect updated contextual meaning with regard to standardized image characters). The character management system 700 can also dynamically update the client device 702 (e.g., the standardized image character library 736) to reflect changes to the server standardized image library 748.

Additional or alternatively, the character management system 700 can provide a portion of the server standardized image character library 748 to the client device 702. For example, the server standardized image character library 748 may contain a large volume of data irrelevant to a user of the client device 702 (e.g., contextual meaning data regarding languages not utilized by the client device 702). Accordingly, in one or more embodiments, the character management system 700 provides only a portion of the server standardized image character library 748 to the client device 702. For example, the character management system 700 can provide a portion of the server standardized image character library 748 that corresponds to standardized image characters routinely utilized by the user. Similarly, the character management system 700 can provide a portion of the server standardized image character library 748 that corresponds to certain characteristics or factors associated with a user of the client device 702 (e.g., a location, language, or operating system associated with the client device 702).

As shown in FIG. 7, the server storage manager 734 also includes server user profiles 750. Server user profiles 750 include user profiles with regard to a plurality of users. In particular, the server user profiles 750 include user profiles with regard to users of the character management system 700 or a social-networking system.

For example, in one or more embodiments, the character management system 700—subject to permission and privacy setting applicable to the client device 702 and users of the client device 702—can receive information from the user profile 740. Moreover, the character management system 700 can aggregate information with regard to other users to the server user profiles 750. Thus, the server user profiles 750 can include data discussed previously with regard to user profile 740 from a plurality of users.

As discussed previously, various components of the character management system 700 can utilize the server user profiles 750 to perform their operations. For instance, the utilization application 714 can identify a recipient of an electronic communication, the character management system 700 can identify one or more characteristics of the recipient based on the server user profiles 750 (e.g., a language utilized by the recipient), and the character management system can determine a contextual meaning of the standardized image characteristics based on the one or more characteristics of the recipient.

Similarly, the repository manager 722 can utilize the server user profiles 750 to identify electronic documents to include in the electronic document repository 746. For example, the repository manager 722 can create a repository of electronic documents from a particular location by identifying users from a particular location (based on the server user profiles 750) and collecting documents created by the users from the particular location.

Each of the components 706-734 of the character management system 700 and their corresponding elements may be in communication with one another using any suitable communication technologies. It will be recognized that although components 706-734 and their corresponding elements are shown to be separate in FIG. 7, any of components 706-734 and their corresponding elements may be combined into fewer components, such as into a single facility or module, divided into more components, or configured into different components as may serve a particular embodiment.

The components 706-734 and their corresponding elements can comprise software, hardware, or both. For example, the components 706-734 and their corresponding elements can comprise one or more instructions stored on a computer-readable storage medium and executable by processors of one or more computing devices. When executed by the one or more processors, the computer-executable instructions of the character management system 700 can cause the client device 702 and/or the server 704 to perform the methods described herein. Alternatively, the components 706-734 and their corresponding elements can comprise hardware, such as a special purpose processing device to perform a certain function or group of functions. Additionally or alternatively, the components 706-734 and their corresponding elements can comprise a combination of computer-executable instructions and hardware.

Furthermore, the components 706-734 of the character management system 700 may, for example, be implemented as one or more stand-alone applications, as one or more modules of an application, as one or more plug-ins, as one or more library functions or functions that may be called by other applications, and/or as a cloud-computing model. Thus, the components 706-734 of the character management system 700 may be implemented as a stand-alone application, such as a desktop or mobile application. Furthermore, the components 706-734 of the character management system 700 may be implemented as one or more web-based applications hosted on a remote server. Alternatively or additionally, the components of the character management system 700 may be implemented in a suit of mobile device applications or "apps."

Figure 8:
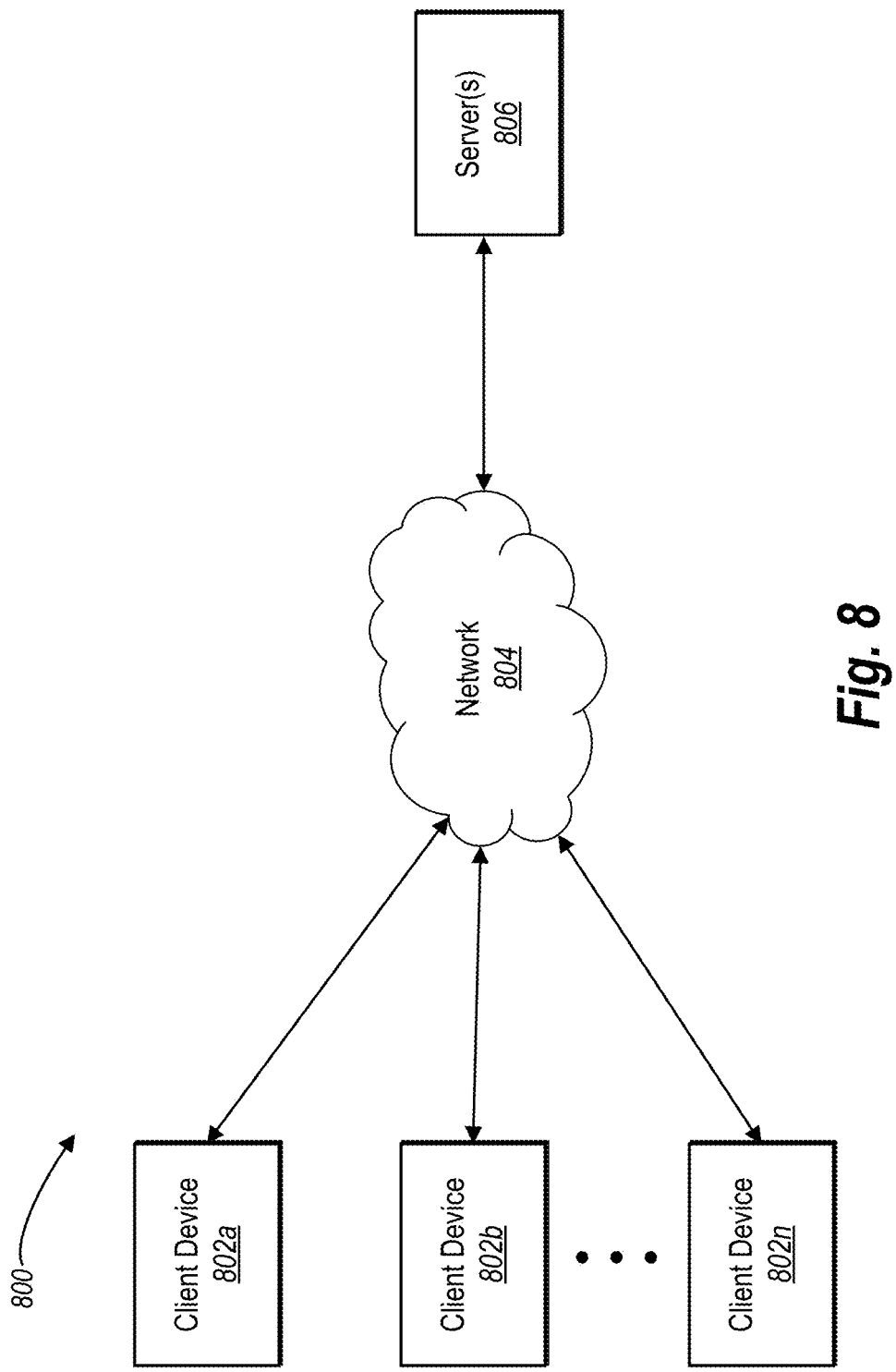
FIG. 8 illustrates a schematic diagram of a network environment in which the methods and systems disclosed herein may be implemented in accordance with one or more embodiments.

Turning now to FIG. 8, further information will be provided regarding implementation of the character management system 700. Specifically, FIG. 8 illustrates a schematic diagram of one embodiment of an exemplary system environment ("environment") 800 in which the character management system 700 can operate. As illustrated in FIG. 8, the environment 800 can include client devices 802a-802n, a network 804, and server(s) 806. The client devices 802a-802n, the network 804, and the server(s) 806 may be communicatively coupled with each other either directly or indirectly (e.g., through the network 804). The client devices 802a-802n, the network 804, and the server(s) 806 may communicate using any communication platforms and technologies suitable for transporting data and/or communication signals, including any known communication technologies, devices, media, and protocols supportive of remote data communications, examples of which will be described in more detail below.

As just mentioned, and as illustrated in FIG. 8, the environment 800 can include the client devices 802a-802n. The client devices 802a-802n (e.g., the client device 702 or the computing devices 300, 400, 500, and 600) may comprise any type of computing device. For example, the client devices 802a-802n may comprise one or more personal computers, laptop computers, mobile devices, mobile phones, tablets, special purpose computers, TVs, or other computing devices. In one or more embodiments, the client devices 802a-802n may comprise computing devices capable of communicating with each other or the server(s) 806. The client devices 802a-802n may comprise one or more computing devices as discussed in greater detail below.

As illustrated in FIG. 8, the client devices 802a-802n and/or the server(s) 806 may communicate via the network 804. The network 804 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 804 may be any suitable network over which the client devices 802a-802n (or other components) may access the server(s) 806 or vice versa. The network 804 will be discussed in more detail below.

Moreover, as illustrated in FIG. 8, the environment 800 also includes the server(s) 806. The server(s) 806 (e.g., the server 704) may generate, store, receive, and/or transmit any type of data, including a standardized image character library (e.g., the server standardized image character library 748), user profile 740, search queries, search results, or electronic communications. For example, the server(s) 806 may receive data from the client device 802a and send the data to the client device 802b. In one example, server(s) 806 can host a social network. In one or more embodiments, the server(s) 806 may comprise a data server. The server(s) 806 can also comprise a communication server or a web-hosting server. Regardless, the server(s) 806 can be configured to receive a wide range of electronic documents or communications, including but not limited to, text messages, instant messages, social-networking messages, social-networking posts, emails, tags, comments, and any other form of electronic communications or electronic documents. Additional details regarding the server(s) 806 will be discussed below.

Although FIG. 8 illustrates three client devices 802a-802n, it will be appreciated that the client devices 802a-802n can represent any number of computing devices (fewer or greater than shown). Similarly, although FIG. 8 illustrates a particular arrangement of the client devices 802a-802n, the network 804, and the server(s) 806, various additional arrangements are possible.

In addition to the elements of the environment 800, one or more users user can be associated with each of the client devices 802a-802n. For example, users may be individuals (i.e., human users). The environment 800 can include a single user or a large number of users, with each of the users interacting with the character management system 700 through a corresponding number of computing devices. For example, a user can interact with the client device 802a for the purpose of composing and sending an electronic communication (e.g., instant message). The user may interact with the client device 802a by way of a user interface on the client device 802a. For example, the user can utilize the user interface to cause the client device 802a to create and send an electronic communication to one or more of the plurality of users of the character management system 700.

By way of an additional example, in one or more embodiments the server(s) 806 (e.g., the server 704) gathers social media posts, comments, content, and tags provided by the client devices 802a-802n (e.g., via the utilization application 714 interacting with the social graph 732). The server(s) 806 compiles a repository of electronic documents (e.g., the electronic document repository 746) from the gathered social media posts, comments, and tags. Moreover, the server(s) 806 determines contextual meaning with regard to a plurality of standardized image characters within the repository of electronic documents (e.g., utilizing the image character identifier 720, the repository manager 722, and the semantic engine 724). Moreover, the client device 802a (e.g., the client device 702) can provide a search query with regard to a second repository of electronic documents to the server(s) 806 (e.g., via the utilization application 714 and the standardized image character manager 712). The server(s) 806 can conduct a search with regard to standardized image characters based on the determined contextual meaning (e.g., via the search facility 726), and provide responsive electronic documents to the client device 802a.

As illustrated by the previous example embodiment, the character management system 700 may be implemented in whole, or in part, by the individual elements 802a-806 of the environment 800. Although the previous example, described certain components of the character management system 700 implemented with regard to certain components of the environment 800, it will be appreciated that components of the character management system 700 can be implemented in any of the components of the environment 800. For example, in one or more embodiments, the image character identifier 720 can be implemented on the client device 802a. Similarly, in one or more embodiments, the utilization application 714 may be implemented (in whole or in part) on the server(s) 806.

Figure 9:
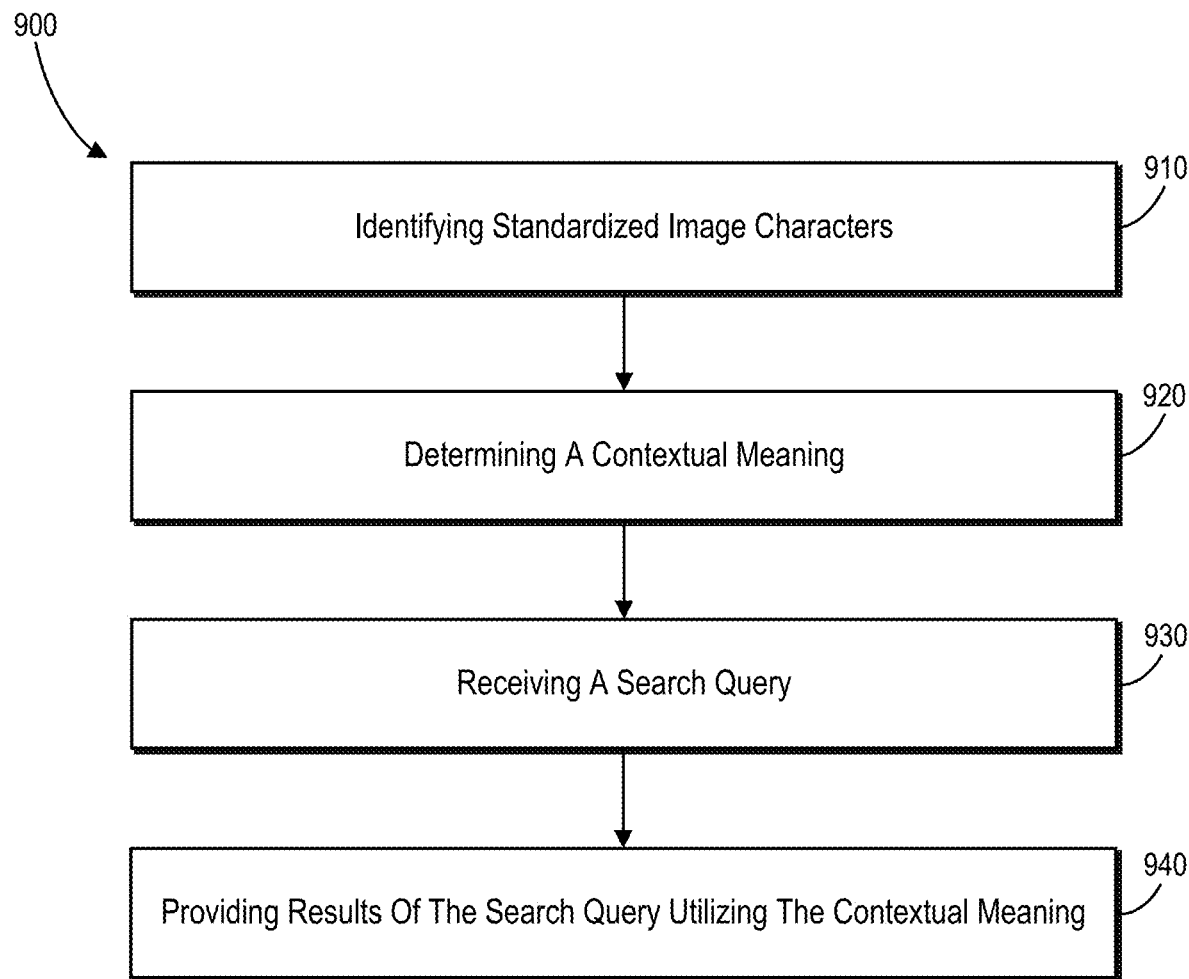
FIG. 9 illustrates a flow chart of a method of facilitating an electronic communication in accordance with one or more embodiments.
Figure 10:
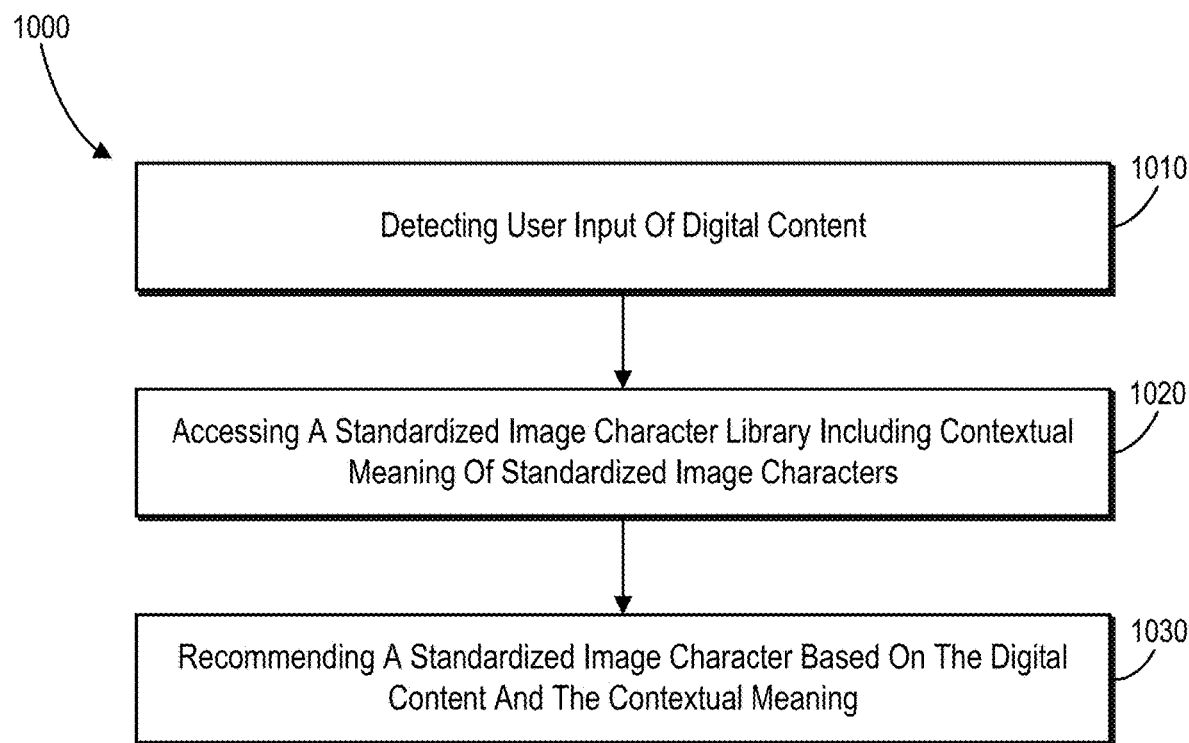
FIG. 10 illustrates a flow chart of a method of facilitating an electronic communication in accordance with one or more embodiments.

FIGS. 1-8, the corresponding text, and the examples, provide a number of different systems and devices that allows a user to identify and utilize standardized image characters. In addition to the foregoing, embodiments can also be described in terms of flowcharts comprising acts and steps in a method for accomplishing a particular result. For example, FIGS. 9 and 10 illustrate flowcharts of exemplary methods in accordance with one or more embodiments of the present invention. The methods described in relation to FIGS. 9 and 10 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart of a series of acts in a method 900 of identifying and utilizing standardized characters in accordance with one or more embodiments. In one or more embodiments, the method 900 is performed in a digital medium environment that includes the character management system 700. The method 900 is intended to be illustrative of one or more methods in accordance with the present disclosure, and is not intended to limit potential embodiments. Alternative embodiments can include additional, fewer, or different steps than those articulated in FIG. 9.

The method 900 includes an act 910 of identifying standardized image characters. In particular, the act 910 includes identifying a plurality of standardized image characters from a repository of electronic documents. In particular, in one or more embodiments the plurality of standardized image characters comprise standardized image characters from different platforms, standardized image characters from different codebases, and standardized image characters utilizing different numbers of code points.

As shown in FIG. 9, the method 900 also includes an act 920 of determining a contextual meaning. In particular, the act 920 can include determining, by at least one processor, a contextual meaning for the plurality of standardized image characters based on the manner in which the standardized image characters are utilized in the repository of electronic documents. For instance, the act 920 can include utilizing a word to vector algorithm in conjunction with the repository of electronic documents and the standardized image characters.

As illustrated in FIG. 9, the method 900 also includes an act 930 of receiving a search query. In particular, the act 930 can include receiving a search query from a client device. For example, the act 930 can include receiving a standardized image character and a request to search a plurality of target electronic documents based on the standardized image character. Moreover, the act 930 can include receiving search content and a request to search a plurality of target electronic documents based on the search content.

Furthermore, as shown in FIG. 9, the method 900 includes an act 940 of providing results of the search query utilizing the contextual meaning. In particular, the act 940 can include providing, by the at least one processor, results of the search query to the client device utilizing the identified contextual meaning for at least one of the plurality of standardized image characters. In one or more embodiments, the act 940 includes conducting a search utilizing the contextual meaning of the received standardized image character. In addition, the act 940 can include identifying one or more standardized image characters within the plurality of target electronic documents, the identified one or more standardized image characters being a subset of the plurality of standardized image characters. Moreover, the act 940 can include comparing the search content and the contextual meaning of the identified one or more standardized image characters within the plurality of target electronic documents. Furthermore, the act 940 can include providing for display, based on the comparison of the search content and the contextual meaning of the identified one or more standardized image characters within the plurality of target electronic documents, at least one of the one or more standardized image characters within the plurality of target electronic documents.

For instance, in one or more embodiments, the search content comprises a first standardized image character. Moreover, in one or more embodiments comparing the search content and the contextual meaning of the identified one or more standardized image characters comprises comparing the contextual meaning of the first standardized image character and the contextual meaning of the one or more standardized image characters.

Similarly, in one or more embodiments, the search content further comprises text. Moreover, in one or more embodiments comparing the search content and the contextual meaning of the identified one or more standardized image characters further comprises comparing the contextual meaning of the first standardized image character, the text, and the contextual meaning of the one or more standardized image characters.

In addition, in one or more embodiments, the search content comprises an image. Moreover, in one or more embodiments, comparing the search content and the contextual meaning of the identified one or more standardized image characters further comprises identifying one or more features of the image and comparing the one or more features of the image and the contextual meaning of the one or more standardized image characters.

Furthermore, in one or more embodiments, the repository of electronic documents reflects electronic documents generated by users sharing a first characteristic. Moreover, the method 900 can further include identifying the plurality of standardized image characters from a second repository of electronic documents, the second repository of electronic documents reflecting electronic documents generated by users sharing a second common characteristic. Similarly, the method 900 can include identifying, by at least one processor, a second contextual meaning for each of the plurality of standardized image characters based on the manner in which each of the standardized image characters are utilized in the second repository of electronic documents. In addition, the method 900 can include receiving a search query from a second client device; determining that the search query corresponds to a user with the second common characteristic; and providing, by the at least one processor, results of the search query to the client device utilizing the identified second contextual meaning of at least one of the standardized image characters.

As mentioned previously, FIG. 10 illustrates another flowchart of a series of acts in a method 1000 of identifying and utilizing standardized image characters in accordance with one or more embodiments. As shown, the method 1000 includes an act 1010 of detecting user input of digital content. For instance, the digital content can comprise text and a first standardized image character. Similarly, the digital content can comprise an image. In addition, the act 1010 can include detecting user input of a first standardized image character.

As illustrated in FIG. 10, the method 1000 also includes an act 1020 of accessing a standardized image character library including contextual meaning of standardized image characters. In particular, the act 1020 can include accessing a standardized image character library, the standardized image character library including contextual meanings for a plurality of standardized image characters based on the manner in which the standardized image characters are utilized in a plurality of electronic documents.

In addition, as shown in FIG. 10, the method 1000 also includes the act 1030 of recommending a standardized image character based on the digital content and the contextual meaning. In particular, the act 1030 can include recommending a standardized image character to the user based on the digital content and the contextual meanings of the plurality of standardized image characters. Moreover, the act 1030 can include comparing the digital content with the contextual meaning for the plurality of standardized image characters; and identifying the standardized image character based on the comparison. In addition, the act 1030 can include identifying a contextual meaning of the first standardized image character; and recommending the standardized image character based on the contextual meaning of the first standardized image character and a contextual meaning of the standardized image character.

Furthermore, the method 1000 can also include determining an incongruity between the text and the first standardized image character. Moreover, the method 1000 can include comparing the text and the contextual meanings for the plurality of standardized image characters; and based on the determined incongruity and the comparison between the text and the contextual meanings for the plurality of standardized image characters, recommending the standardize image character to the user.

Figure 11:
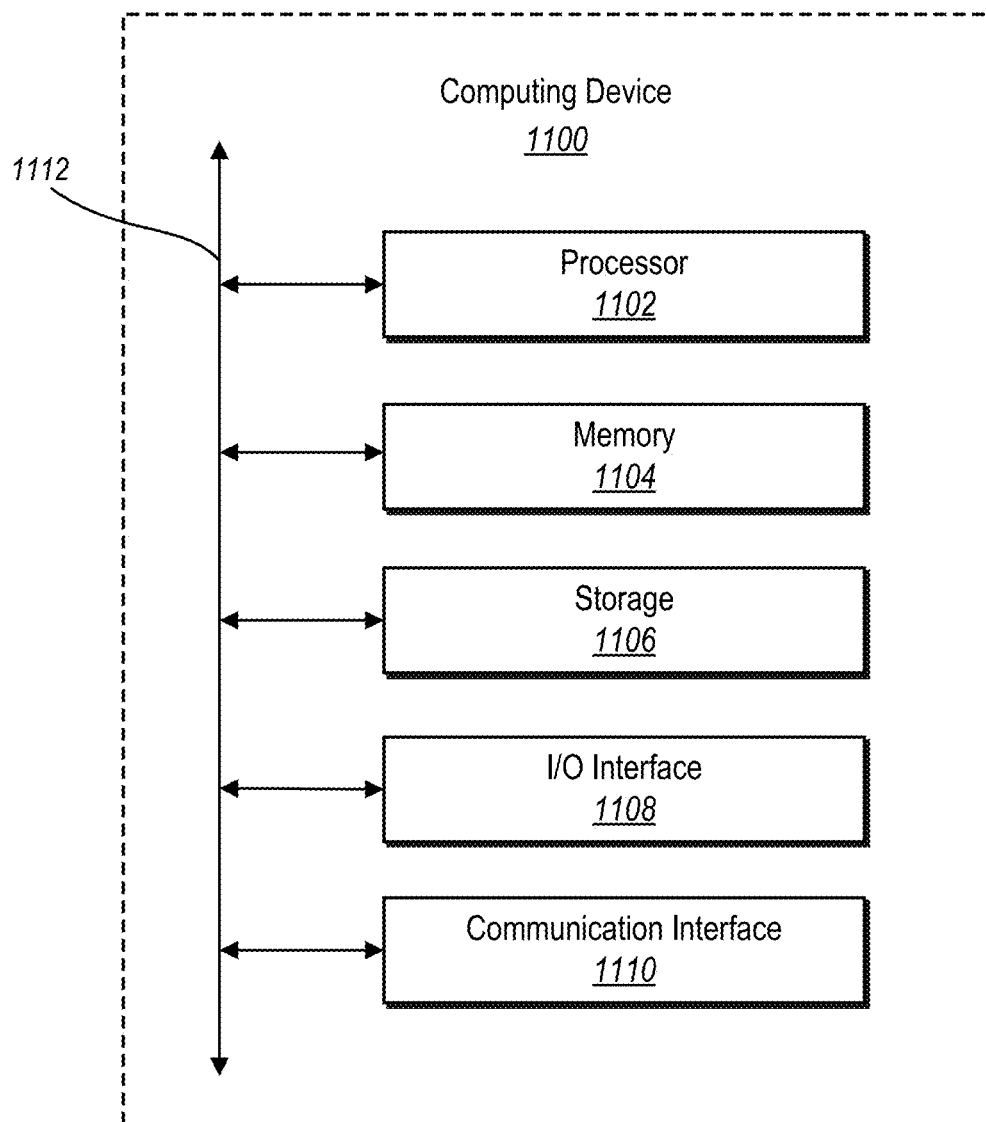
FIG. 11 illustrates a block diagram of an exemplary computing device in accordance with one or more embodiments.

In addition, the method 1000 can also include identifying one or more features of the image. Moreover, the method 1000 can include determining a congruity between the one or more features of the image and a contextual meaning of the standardized image; and recommending the standardized image character to the user based on the determined congruity FIG. 11 illustrates, in block diagram form, an exemplary computing device 1100 that may be configured to perform one or more of the processes described above. One will appreciate that character management system 700, the client device 702, the server 704, the client devices 802a-802n, sever(s) 806, and the environment 800 comprise one or more computing devices in accordance with implementations of computing device 1100. As shown by FIG. 11, the computing device can comprise a processor 1102, a memory 1104, a storage device 1106, an I/O interface 1108, and a communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, a computing device 1100 can include fewer components than those shown in FIG. 11. Components of computing device 1100 shown in FIG. 11 will now be described in additional detail.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular embodiments, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to the computing device 1100. In particular embodiments, storage device 1106 is non-volatile, solid-state memory. In other embodiments, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, environment 800 may be linked to and/or implemented within a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 12:
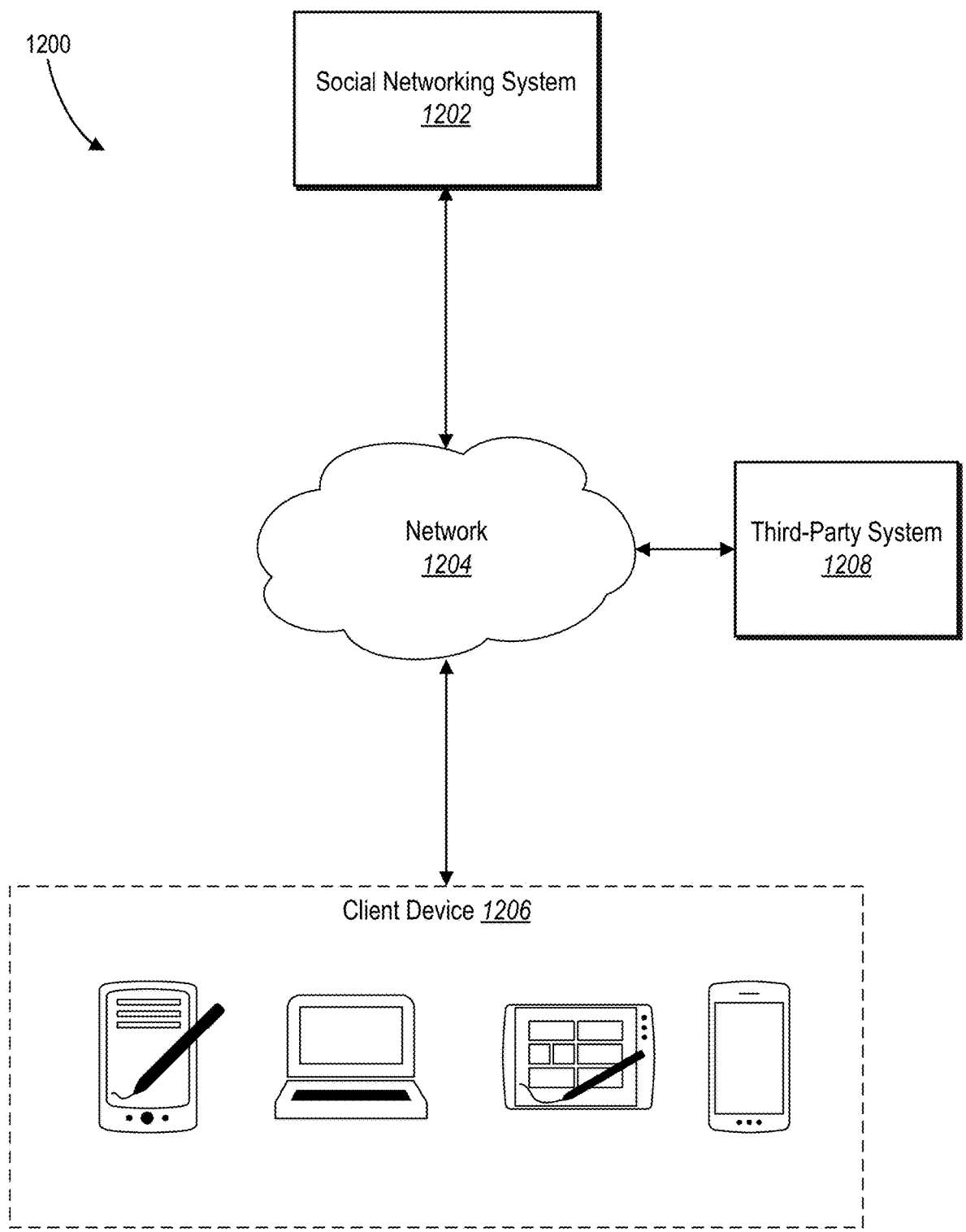
FIG. 12 illustrates a network environment of a social-networking system according one or more embodiments.

FIG. 12 illustrates an example network environment of a social-networking system. In particular embodiments, a social-networking system 1202 may comprise one or more data stores. In particular embodiments, the social-networking system 1202 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 1202 may comprise one or more computing devices (e.g., servers) hosting functionality directed to operation of the social-networking system 1202. A user of the social-networking system 1202 may access the social-networking system 1202 using a client device such as client device 1206. In particular embodiments, the client device 1206 can interact with the social-networking system 1202 through a network 1204.

The client device 1206 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access the social-networking system 1202.

While these methods, systems, and user interfaces utilize both publicly available information as well as information provided by users of the social-networking system, all use of such information is to be explicitly subject to all privacy settings of the involved users and the privacy policy of the social-networking system as a whole.

Figure 13:
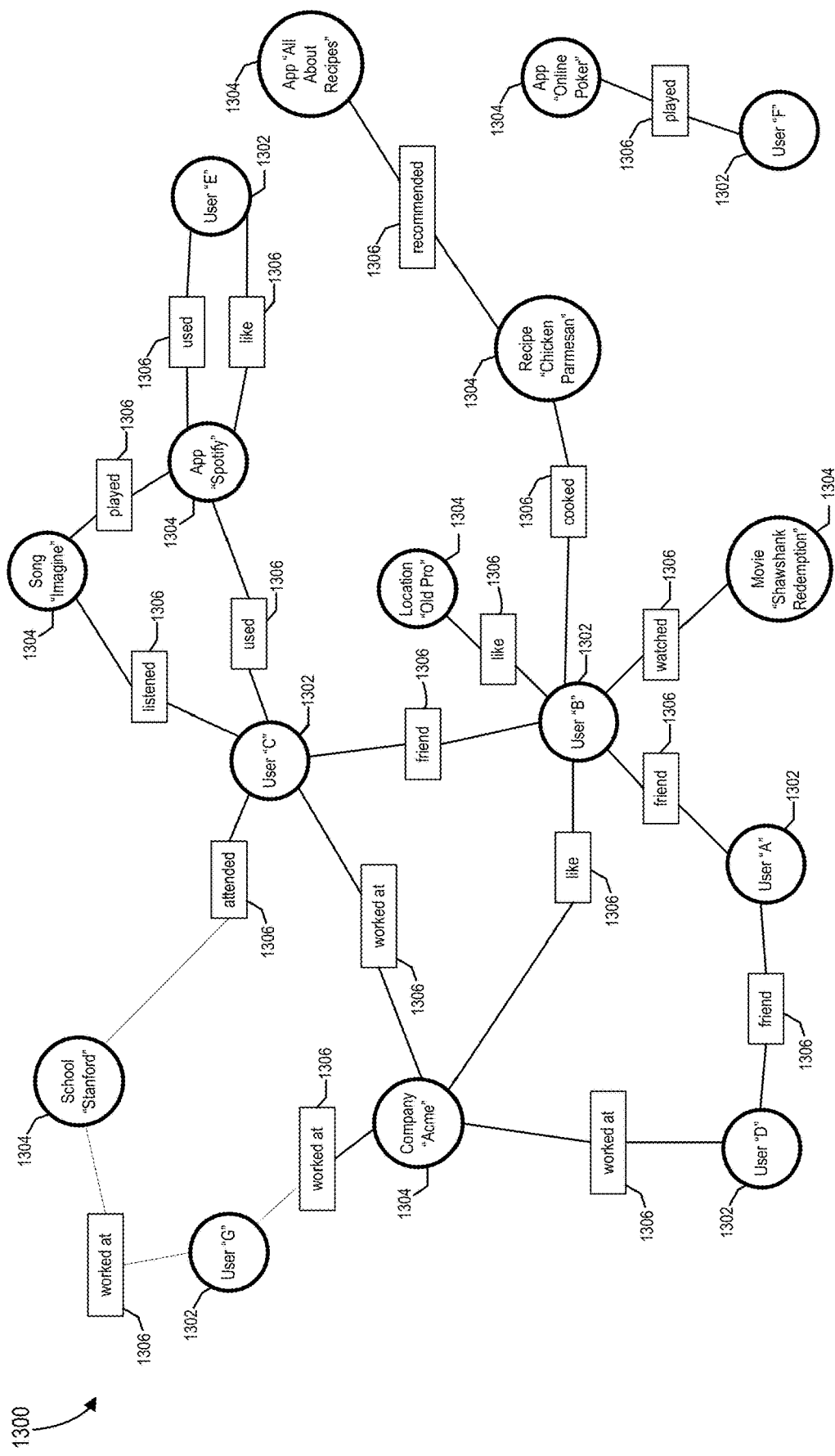
FIG. 13 illustrates an example social graph of a social networking system in accordance with one or more embodiments.

FIG. 13 illustrates example social graph 1300. In particular embodiments, social networking system 1202 may store one or more social graphs 1300 in one or more data stores. In particular embodiments, social graph 1300 may include multiple nodes—which may include multiple user nodes 1302 or multiple concept nodes 1304—and multiple edges 1306 connecting the nodes. Example social graph 1300 illustrated in FIG. 13 is shown, for didactic purposes, in a two-dimensional visual map representation. In particular embodiments, a social networking system 1202, client device 1206, or third-party system 1208 may access social graph 1300 and related social-graph information for suitable applications. The nodes and edges of social graph 1300 may be stored as data objects, for example, in a data store (such as a social-graph database). Such a data store may include one or more searchable or query able indexes of nodes or edges of social graph 1300.

In particular embodiments, a user node 1302 may correspond to a user of social networking system 1202. As an example and not by way of limitation, a user may be an individual (human user), an entity (e.g., an enterprise, business, or third-party application), or a group (e.g., of individuals or entities) that interacts or communicates with or over social networking system 1202. In particular embodiments, when a user registers for an account with social networking system 1202, social networking system 1202 may create a user node 1302 corresponding to the user, and store the user node 1302 in one or more data stores. Users and user nodes 1302 described herein may, where appropriate, refer to registered users and user nodes 1302 associated with registered users. In addition or as an alternative, users and user nodes 1302 described herein may, where appropriate, refer to users that have not registered with social networking system 1202. In particular embodiments, a user node 1302 may be associated with information provided by a user or information gathered by various systems, including social networking system 1202. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1304 may correspond to a concept. As an example and not by way of limitation, a concept may correspond to a place (such as, for example, a movie theater, restaurant, landmark, or city); a website (such as, for example, a website associated with social-network system 1202 or a third-party website associated with a web-application server); an entity (such as, for example, a person, business, group, sports team, or celebrity); a resource (such as, for example, an audio file, video file, digital photo, text file, structured document, or application) which may be located within social networking system 1202 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1304 may be associated with information of a concept provided by a user or information gathered by various systems, including social networking system 1202. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1304 may be associated with one or more data objects corresponding to information associated with concept node 1304. In particular embodiments, a concept node 1304 may correspond to one or more webpages.

In particular embodiments, a node in social graph 1300 may represent or be represented by a webpage (which may be referred to as a "profile page"). Profile pages may be hosted by or accessible to social networking system 1202. Profile pages may also be hosted on third-party websites associated with a third-party server 1208. As an example and not by way of limitation, a profile page corresponding to a particular external webpage may be the particular external webpage and the profile page may correspond to a particular concept node 1304. Profile pages may be viewable by all or a selected subset of other users. As an example and not by way of limitation, a user node 1302 may have a corresponding user-profile page in which the corresponding user may add content, make declarations, or otherwise express himself or herself. As another example and not by way of limitation, a concept node 1304 may have a corresponding concept-profile page in which one or more users may add content, make declarations, or express themselves, particularly in relation to the concept corresponding to concept node 1304.

In particular embodiments, a concept node 1304 may represent a third-party webpage or resource hosted by a third-party system 1208. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1206 to send to social networking system 1202 a message indicating the user's action. In response to the message, social networking system 1202 may create an edge (e.g., an "eat" edge) between a user node 1302 corresponding to the user and a concept node 1304 corresponding to the third-party webpage or resource and store edge 1306 in one or more data stores.

In particular embodiments, a pair of nodes in social graph 1300 may be connected to each other by one or more edges 1306. An edge 1306 connecting a pair of nodes may represent a relationship between the pair of nodes. In particular embodiments, an edge 1306 may include or represent one or more data objects or attributes corresponding to the relationship between a pair of nodes. As an example and not by way of limitation, a first user may indicate that a second user is a "friend" of the first user. In response to this indication, social networking system 1202 may send a "friend request" to the second user. If the second user confirms the "friend request," social networking system 1202 may create an edge 1306 connecting the first user's user node 1302 to the second user's user node 1302 in social graph 1300 and store edge 1306 as social-graph information in one or more of data stores. In the example of FIG. 13, social graph 1300 includes an edge 1306 indicating a friend relation between user nodes 1302 of user "A" and user "B" and an edge indicating a friend relation between user nodes 1302 of user "C" and user "B." Although this disclosure describes or illustrates particular edges 1306 with particular attributes connecting particular user nodes 1302, this disclosure contemplates any suitable edges 1306 with any suitable attributes connecting user nodes 1302. As an example and not by way of limitation, an edge 1306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1300 by one or more edges 1306.

In particular embodiments, an edge 1306 between a user node 1302 and a concept node 1304 may represent a particular action or activity performed by a user associated with user node 1302 toward a concept associated with a concept node 1304. As an example and not by way of limitation, as illustrated in FIG. 13, a user may "like,"

"attended," "played," "listened," "cooked," "worked at," or "watched" a concept, each of which may correspond to a edge type or subtype. A concept-profile page corresponding to a concept node 1304 may include, for example, a selectable "check in" icon (such as, for example, a clickable "check in" icon) or a selectable "add to favorites" icon. Similarly, after a user clicks these icons, social networking system 1202 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1202 may create a "listened" edge 1306 and a "used" edge (as illustrated in FIG. 13) between user nodes 1302 corresponding to the user and concept nodes 1304 corresponding to the song and application to indicate that the user listened to the song and used the application. Moreover, social networking system 1202 may create a "played" edge 1306 (as illustrated in FIG. 13) between concept nodes 1304 corresponding to the song and the application to indicate that the particular song was played by the particular application. In this case, "played" edge 1306 corresponds to an action performed by an external application (SPOTIFY) on an external audio file (the song "Imagine"). Although this disclosure describes particular edges 1306 with particular attributes connecting user nodes 1302 and concept nodes 1304, this disclosure contemplates any suitable edges 1306 with any suitable attributes connecting user nodes 1302 and concept nodes 1304. Moreover, although this disclosure describes edges between a user node 1302 and a concept node 1304 representing a single relationship, this disclosure contemplates edges between a user node 1302 and a concept node 1304 representing one or more relationships. As an example and not by way of limitation, an edge 1306 may represent both that a user likes and has used at a particular concept. Alternatively, another edge 1306 may represent each type of relationship (or multiples of a single relationship) between a user node 1302 and a concept node 1304 (as illustrated in FIG. 13 between user node 1302 for user "E" and concept node 1304 for "SPOTIFY").

In particular embodiments, social networking system 1202 may create an edge 1306 between a user node 1302 and a concept node 1304 in social graph 1300. As an example and not by way of limitation, a user viewing a concept-profile page (such as, for example, by using a web browser or a special-purpose application hosted by the user's client device 1206) may indicate that he or she likes the concept represented by the concept node 1304 by clicking or selecting a "Like" icon, which may cause the user's client device 1206 to send to social networking system 1202 a message indicating the user's liking of the concept associated with the concept-profile page. In response to the message, social networking system 1202 may create an edge 1306 between user node 1302 associated with the user and concept node 1304, as illustrated by "like" edge 1306 between the user and concept node 1304. In particular embodiments, social networking system 1202 may store an edge 1306 in one or more data stores. In particular embodiments, an edge 1306 may be automatically formed by social networking system 1202 in response to a particular user action. As an example and not by way of limitation, if a first user uploads a picture, watches a movie, or listens to a song, an edge 1306 may be formed between user node 1302 corresponding to the first user and concept nodes 1304 corresponding to those concepts. Although this disclosure describes forming particular edges 1306 in particular manners, this disclosure contemplates forming any suitable edges 1306 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 1202). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1202 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1202) or RSVP (e.g., through social networking system 1202) to an event associated with the advertisement. In addition or as an alternative, an advertisement may include social-networking-system context directed to the user. As an example and not by way of limitation, an advertisement may display information about a friend of the user within social networking system 1202 who has taken an action associated with the subject matter of the advertisement.

In particular embodiments, social networking system 1202 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1208 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1202 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1202 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 250%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 1202 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1202 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1202 may calculate a coefficient based on a user's actions. Social networking system 1202 may monitor such actions on the online social network, on a third-party system 1208, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1202 may calculate a coefficient based on the user's actions with particular types of content. The content may be associated with the online social network, a third-party system 1208, or another suitable system. The content may include users, profile pages, posts, news stories, headlines, instant messages, chat room conversations, emails, advertisements, pictures, video, music, other suitable objects, or any combination thereof. Social networking system 1202 may analyze a user's actions to determine whether one or more of the actions indicate an affinity for subject matter, content, other users, and so forth. As an example and not by way of limitation, if a user may make frequently posts content related to "coffee" or variants thereof, social networking system 1202 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 1202 may calculate a coefficient based on the type of relationship between particular objects. Referencing the social graph 1300, social networking system 1202 may analyze the number and/or type of edges 1306 connecting particular user nodes 1302 and concept nodes 1304 when calculating a coefficient. As an example and not by way of limitation, user nodes 1302 that are connected by a spouse-type edge (representing that the two users are married) may be assigned a higher coefficient than a user nodes 1302 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 1202 may determine that the user has a higher coefficient with respect to the first photo than the second photo because having a tagged-in-type relationship with content may be assigned a higher weight and/or rating than having a like-type relationship with content. In particular embodiments, social networking system 1202 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 1202 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1300. As an example and not by way of limitation, social-graph entities that are closer in the social graph 1300 (i.e., fewer degrees of separation) may have a higher coefficient than entities that are further apart in the social graph 1300.

In particular embodiments, social networking system 1202 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1206 of the user). A first user may be more interested in other users or concepts that are closer to the first user. As an example and not by way of limitation, if a user is one mile from an airport and two miles from a gas station, social networking system 1202 may determine that the user has a higher coefficient for the airport than the gas station based on the proximity of the airport to the user.

In particular embodiments, social networking system 1202 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1202 may provide information that is relevant to user's interests and current circumstances, increasing the likelihood that they will find such information of interest. In particular embodiments, social networking system 1202 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1202 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 1202 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1208 (e.g., via an API or other communication channel), or from another suitable system. In response to the request, social networking system 1202 may calculate the coefficient (or access the coefficient information if it has previously been calculated and stored). In particular embodiments, social networking system 1202 may measure an affinity with respect to a particular process. Different processes (both internal and external to the online social network) may request a coefficient for a particular object or set of objects. Social networking system 1202 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1304 corresponding to a particular photo may have a privacy setting specifying that the photo may only be accessed by users tagged in the photo and their friends. In particular embodiments, privacy settings may allow users to opt in or opt out of having their actions logged by social networking system 1202 or shared with other systems (e.g., third-party system 1208). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1208, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1202 may send a request to the data store for the object. The request may identify the user associated with the request and may only be sent to the user (or a client system 1206 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   determining contextual meanings for a plurality of standardized image characters based on a manner in which the plurality of standardized image characters are utilized in a repository of electronic documents;
   analyzing digital text in an electronic communication of a client device;
   generating, based on analyzing the digital text and the contextual meanings for the plurality of standardized image characters, a suggested standardized image character corresponding to the digital text; and
   providing, for display via the client device, the suggested standardized image character.

2. The method of claim 1, wherein determining the contextual meanings for the plurality of standardized image characters based on the manner in which the standardized image characters are utilized in the repository of electronic documents comprises utilizing a word to vector algorithm to generate vector representations of the plurality of standardized image characters based on the repository of electronic documents.

3. The method of claim 1, further comprising generating the suggested standardized image character by comparing the digital text in the electronic communication with the contextual meanings for the plurality of standardized image characters.

4. The method of claim 3, wherein comparing the digital text in the electronic communication with the contextual meanings for the plurality of standardized image characters comprises comparing a vector representation of the digital text with vector representations of the standardized image characters.

5. The method of claim 1, wherein the digital text in the electronic communication comprises a standardized image character and further comprising generating the suggested standardized image character by comparing a contextual meaning for the standardized image character with a plurality of alternate digital texts.

6. The method of claim 1, wherein the digital text in the electronic communication comprises a standardized image character and additional digital text, and further comprising:
   determining a conflict between a contextual meaning for the standardized image character and the additional digital text; and
   providing a suggested replacement text based on the conflict.

7. The method of claim 1, wherein the digital text in the electronic communication comprises a standardized image character and further comprising determining the suggested standardized image character by comparing a contextual meaning of the standardized image character and a contextual meaning of the suggested standardized image character.

8. A system comprising:
   at least one processor; and
   at least one non-transitory computer readable storage medium storing instructions that, when executed by the at least one processor, cause the system to:
   determine contextual meanings for a plurality of standardized image characters based on a manner in which the plurality of standardized image characters are utilized in a repository of electronic documents;
   analyze digital text in an electronic communication of a client device;
   generate, based on analyzing the digital text and the contextual meanings for the plurality of standardized image characters, a suggested standardized image character corresponding to the digital text; and
   provide, for display via the client device, the suggested standardized image character.

9. The system of claim 8, further comprising instructions that, when executed by the at least one processor, cause the system to determine the contextual meanings for the plurality of standardized image characters based on the manner in which the standardized image characters are utilized in the repository of electronic documents by utilizing a word to vector algorithm to generate vector representations of the plurality of standardized image characters based on the repository of electronic documents.

10. The system of claim 8, further comprising instructions that, when executed by the at least one processor, cause the system to generate the suggested standardized image character by comparing the digital text in the electronic communication with the contextual meanings for the plurality of standardized image characters.

11. The system of claim 10, further comprising instructions that, when executed by the at least one processor, cause the system to compare the digital text in the electronic communication with the contextual meanings for the plurality of standardized image characters by comparing a vector representation of the digital text with vector representations of the standardized image characters.

12. The system of claim 8, wherein the digital text in the electronic communication comprises a standardized image character and further comprising instructions that, when executed by the at least one processor, cause the system to generate the suggested standardized image character by comparing a contextual meaning for the standardized image character with a plurality of alternate digital texts.

13. The system of claim 8, wherein the digital text in the electronic communication comprises a standardized image character and additional digital text, and further comprising instructions that, when executed by the at least one processor, cause the system to:
   determine a conflict between a contextual meaning for the standardized image character and the additional digital text; and
   provide a suggested replacement text based on the conflict.

14. The system of claim 8, wherein the digital text in the electronic communication comprises a standardized image character and further comprising instructions that, when executed by the at least one processor, cause the system to determine the suggested standardized image character by comparing a contextual meaning of the standardized image character and a contextual meaning of the suggested standardized image character.

15. A non-transitory computer readable medium storing instructions thereon that, when executed by at least one processor, cause a computer system to:
   determine contextual meanings for a plurality of standardized image characters based on a manner in which the plurality of standardized image characters are utilized in a repository of electronic documents;
   analyze digital text in an electronic communication of a client device;
   generate, based on analyzing the digital text and the contextual meanings for the plurality of standardized image characters, a suggested standardized image character corresponding to the digital text; and
   provide, for display via the client device, the standardized image character.

16. The non-transitory computer readable medium of claim 15, further comprising instructions that, when executed by the at least one processor, cause the computer system to determine the contextual meanings for the plurality of standardized image characters based on the manner in which the standardized image characters are utilized in the repository of electronic documents by utilizing a word to vector algorithm to generate vector representations of the plurality of standardized image characters based on the repository of electronic documents.

17. The non-transitory computer readable medium of claim 15, further comprising instructions that, when executed by the at least one processor, cause the computer system to generate the suggested standardized image character by comparing the digital text in the electronic communication with the contextual meanings for the plurality of standardized image characters.

18. The non-transitory computer readable medium of claim 17, further comprising instructions that, when executed by the at least one processor, cause the computer system to compare the digital text in the electronic communication with the contextual meanings for the plurality of standardized image characters by comparing a vector representation of the digital text with vector representations of the standardized image characters.

19. The non-transitory computer readable medium of claim 15, wherein the digital text in the electronic communication comprises a standardized image character and further comprising instructions that, when executed by the at least one processor, cause the computer system to generate the suggested standardized image character by comparing the contextual meaning for the standardized image character with a plurality of alternate digital texts.

20. The non-transitory computer readable medium of claim 15, wherein the digital text in the electronic communication comprises a standardized image character and additional digital text, and further comprising instructions that, when executed by the at least one processor, cause the computer system to:
- determine a conflict between the contextual meaning for the standardized image character and the additional digital text; and
- provide the digital text suggestion by providing a suggested replacement text based on the conflict.

* * * * *